US012592729B2

(12) United States Patent
Jiang et al.

(10) Patent No.: US 12,592,729 B2
(45) Date of Patent: Mar. 31, 2026

(54) HYBRID DISTORTION SUPPRESSION SYSTEM AND METHOD

(71) Applicant: Huawei Technologies Co., Ltd.,
Shenzhen (CN)

(72) Inventors: Hong Jiang, Kernersville, NC (US);
Wael Al-Qaq, Oak Ridge, NC (US);
Zhihang Zhang, Cary, NC (US)

(73) Assignee: HUAWEI TECHNOLOGIES CO.,
LTD., Shenzhen (CN)

( * ) Notice: Subject to any disclaimer, the term of this
patent is extended or adjusted under 35
U.S.C. 154(b) by 337 days.

(21) Appl. No.: 18/186,536

(22) Filed: Mar. 20, 2023

(65) Prior Publication Data

US 2023/0231585 A1 Jul. 20, 2023

Related U.S. Application Data

(63) Continuation of application No.
PCT/US2020/063070, filed on Dec. 3, 2020.

(60) Provisional application No. 63/080,198, filed on Sep.
18, 2020.

(51) Int. Cl.
*H04B 1/04* (2006.01)
*H04B 1/30* (2006.01)

(52) U.S. Cl.
CPC ............. *H04B 1/0475* (2013.01); *H04B 1/30*
(2013.01); *H04B 2001/307* (2013.01)

(58) Field of Classification Search
CPC .. H04B 1/0475; H04B 1/30; H04B 2001/307;
H04B 1/16; Y02D 30/70
See application file for complete search history.

(56) References Cited

U.S. PATENT DOCUMENTS

2018/0139078 A1 5/2018 Mittal et al.
2019/0386868 A1 12/2019 Jiang et al.
2020/0274522 A1 8/2020 Karmaker

*Primary Examiner* — Nader Bolourchi
(74) *Attorney, Agent, or Firm* — Slater Matsil, LLP

(57) ABSTRACT

A method for reducing distortions of a radio frequency (RF)
system includes configuring a plurality of mixers to convert
between a plurality of phase signals and a plurality of RF
signals, configuring a first mixer of the plurality of mixers to
operate in a six-phase operating mode to reduce the distor-
tions of the RF system, and configuring a second mixer of
the plurality of mixers to operate in a three-phase operating
mode to reduce power consumption of the RF system.

20 Claims, 11 Drawing Sheets

1502 — CONFIGURING A PLURALITY OF MIXERS TO CONVERT BETWEEN A PLURALITY OF PHASE SIGNALS A PLURALITY OF RF SIGNALS

1504 — CONFIGURING A FIRST MIXER OF THE PLURALITY OF MIXERS TO OPERATE IN A SIX-PHASE OPERATING MODE TO REDUCE THE DISTORTIONS OF THE RF SYSTEM

1506 — CONFIGURING A SECOND MIXER OF THE PLURALITY OF MIXERS TO OPERATE IN A THREE-PHASE OPERATING MODE TO REDUCE POWER CONSUMPTION OF THE RF SYSTEM

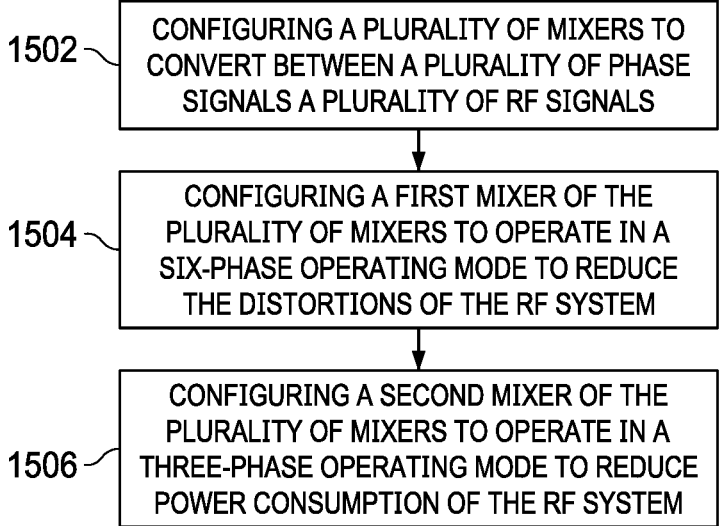

1502 — CONFIGURING A PLURALITY OF MIXERS TO CONVERT BETWEEN A PLURALITY OF PHASE SIGNALS A PLURALITY OF RF SIGNALS

1504 — CONFIGURING A FIRST MIXER OF THE PLURALITY OF MIXERS TO OPERATE IN A SIX-PHASE OPERATING MODE TO REDUCE THE DISTORTIONS OF THE RF SYSTEM

1506 — CONFIGURING A SECOND MIXER OF THE PLURALITY OF MIXERS TO OPERATE IN A THREE-PHASE OPERATING MODE TO REDUCE POWER CONSUMPTION OF THE RF SYSTEM

FIG. 15

HYBRID DISTORTION SUPPRESSION SYSTEM AND METHOD

CROSS-REFERENCE TO RELATED APPLICATIONS

This application is a continuation of International Patent Application No. PCT/US2020/063070, entitled, "Hybrid Distortion Suppression System and Method" and filed on Dec. 3, 2020, which claims benefit of U.S. Provisional Application No. 63/080,198, entitled, "Hybrid Distortion Suppression System and Method" and filed on Sep. 18, 2020, applications of which are hereby incorporated herein by reference in their entireties.

TECHNICAL FIELD

The disclosure generally relates to reducing distortions and improving power consumption in a radio transmitter and/or receiver, or more generally, a transceiver.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of standards such as Global System for Mobile Communications (GSM), Universal Mobile Telecommunications System (UMTS), Long Term Evolution (LTE) and the like.

A wireless network may include a wireless device and a plurality of base stations. The wireless device may be a notebook computer, a mobile phone or a Personal Digital Assistant (PDA), a media player, a gaming device or the like. The base stations communicate with the wireless device over a plurality of wireless channels coupled between the wireless device and the base stations (e.g., a downlink channel from a base station to a wireless device). The wireless device may send back information, including channel information, to the base stations over a plurality of feedback channels (e.g., an uplink channel from the wireless device to the base station).

The wireless device may include a processor, a transmitter and a receiver. The transmitter may be coupled to at least one transmit antenna. The receiver may be coupled to at least one receive antenna. The at least one transmit and at least one receive antenna may be the same or different antennas. One major function of the receiver is rejecting unwanted noise such as signals including harmonics from adjacent channels and, more generally interference so that a desired signal from a wide spectrum of signals from the receive antenna can be better recovered.

As wireless techniques further advance, a three-phase transmitter/receiver for harmonics rejection has emerged as an alternative in mobile phones. One advantageous feature of the three-phase transmitter/receiver is that the three-phase transmitter/receiver is able to eliminate many undesirable distortions in the wireless network.

One disadvantageous feature of the three-phase transmitter/receiver is that some distortions such as the second order counter intermodulation (CIM2) may still exist in the three-phase transmitter/receiver. As the demand of higher data communications increases, the requirement for even lower distortions in the radio frequency system has become increasingly important. In this scenario, the CIM2 distortion may become a dominant factor for mobile handsets and may cause interference and lead to deterioration in the performance of mobile handsets. Accordingly, it would be beneficial to reduce this distortion level so as to improve the performance of the radio frequency system.

SUMMARY

These and other problems are generally solved or circumvented, and technical advantages are generally achieved, by preferred embodiments of the present disclosure which provide an integrated motor drive and isolated battery charger system.

In accordance with an embodiment, a method for reducing distortions of a radio frequency (RF) system comprises configuring a plurality of mixers to convert between a plurality of phase signals and a plurality of RF signals, configuring a first mixer of the plurality of mixers to operate in a six-phase operating mode to reduce the distortions of the RF system, configuring a second mixer of the plurality of mixers to operate in a three-phase operating mode to reduce power consumption of the RF system, and processing the plurality of phase signals and the plurality of RF signals with reduced distortions through configuring the first mixer of the plurality of mixers to operate in the six-phase operating mode.

The plurality of mixers is coupled to a transmitter of the RF system. In some embodiments, the plurality of mixers is in the transmitter of the RF system. Each of the first mixer and the second mixer is coupled to a single-ended power amplifier (PA), and a protected frequency band is located adjacent to a first transmitting frequency of first RF signals generated by the first mixer and away from a second transmitting frequency of second RF signals generated by the second mixer.

The plurality of mixers is coupled to a transmitter of the RF system. In some embodiments, the plurality of mixers is in a transmitter of the RF system. The first mixer is coupled to a single-ended PA. The second mixer is coupled to a differential PA. A protected frequency band is located adjacent to a second transmitting frequency of second RF signals generated by the second mixer.

The plurality of mixers is coupled to a transmitter of the RF system. In some embodiments, the plurality of mixers is in the transmitter of the RF system. Each of the first mixer and the second mixer is coupled to a single-ended PA, and a protected frequency band is located adjacent to a second transmitting frequency of second RF signals generated by the second mixer. An enabled digital pre-distortion algorithm is configured to reduce a second order counter intermodulation (CIM2) component.

The plurality of mixers is coupled to a receiver of the RF system. In some embodiments, the plurality of mixers is in the receiver of the RF system, and a blocker signal is located adjacent to a second or fourth harmonic of a first local oscillator (LO) frequency used by the first mixer, and no blocker signal is located adjacent to a second or fourth harmonic of a second LO frequency used by the second mixer.

A second transmitting frequency of second RF signals processed by the second mixer is higher than a first transmitting frequency of first RF signals processed by the first mixer.

The method further comprises receiving a digital in-phase signal and a quadrature-phase signal, converting the digital in-phase signal and the quadrature-phase signal into a first phase digital signal offset in phase from the digital in-phase signal by 0 degrees, a second phase digital signal offset in phase from the digital in-phase signal by 120 degrees and a third phase digital signal offset in phase from the digital in-phase signal by 240 degrees, through three digital-to-analog converters, converting the first phase digital signal, the second phase digital signal and the third phase digital signal into six phase baseband signals offset by 60 degrees from each other, and producing, based on the six phase baseband signals and a plurality of LO signals, first RF signals processed by the first mixer.

The method further comprises generating three LO signals in response to the three-phase operating mode of the second mixer, wherein the three LO signals are offset by 120 degrees from each other, and each of the three LO signals is of a duty cycle of about 33.33%, and generating six LO signals in response to the six-phase operating mode of the first mixer, wherein the six LO signals are offset by 60 degrees from each other, and each of the six LO signals is of a duty cycle of about 16.67%.

The method further comprises generating a voltage-controlled oscillator (VCO) signal in a phase lock loop, wherein the VCO signal is used to produce the three LO signals in response to the three-phase operating mode of the second mixer, and the six LO signals in response to the six-phase operating mode of the first mixer.

The method further comprises under the six-phase operating mode, configuring the first mixer to mix six phase baseband signals with six LO signals to generate first RF signals, and under the three-phase operating mode, configuring the second mixer to mix six phase baseband signals with three LO signals to generate second RF signals.

In accordance with another embodiment, a method for reducing distortions in a radio frequency (RF) system comprises producing six local oscillator (LO) signals by a LO generator, the six LO signals being fed into a plurality of mixers, configuring a first mixer of the plurality of mixers to operate in a six-phase operating mode to reduce the distortions in the RF system, configuring a second mixer of the plurality of mixers to operate in a three-phase operating mode to reduce power consumption of the RF system, and processing RF signals of the RF system with reduced distortions through configuring the first mixer of the plurality of mixers to operate in the six-phase operating mode.

The plurality of mixers is coupled to a transmitter of the RF system. In some embodiments, the plurality of mixers is in the transmitter of the RF system. Each of the plurality of mixers is coupled to a single-ended power amplifier (PA). A protected frequency band is located adjacent to a first transmitting frequency of first RF signals generated by the first mixer, and no protected frequency band is located adjacent to a second transmitting frequency of second RF signals generated by the second mixer.

The method further comprises configuring the first mixer to generate first RF signals in a first frequency band, and configuring the second mixer to generate second RF signals in a second frequency band higher than the first frequency band.

The method further comprises receiving a digital in-phase signal and a quadrature-phase signal, converting the digital in-phase signal and the quadrature-phase signal into a first phase digital signal offset in phase from the digital in-phase signal by 0 degrees, a second phase digital signal offset in phase from the digital in-phase signal by 120 degrees and a third phase digital signal offset in phase from the digital in-phase signal by 240 degrees, through three digital-to-analog converters, converting the first phase digital signal, the second phase digital signal and the third phase digital signal into six phase signals offset by 60 degrees from each other, generating six LO signals in response to the six-phase operating mode of the first mixer, wherein the six LO signals are offset by 60 degrees from each other, and each of the six LO signals is of a duty cycle of about 16.67%, and producing, based on the six phase signals and the six LO signals, first RF signals generated by the first mixer.

The method further comprises receiving a digital in-phase signal and a quadrature-phase signal, converting the digital in-phase signal and the quadrature-phase signal into a first phase digital signal offset in phase from the digital in-phase signal by 0 degrees, a second phase digital signal offset in phase from the digital in-phase signal by 120 degrees and a third phase digital signal offset in phase from the digital in-phase signal by 240 degrees, through three digital-to-analog converters, converting the first phase digital signal, the second phase digital signal and the third phase digital signal into six phase signals offset by 60 degrees from each other, generating three LO signals in response to the three-phase operating mode of the second mixer, wherein the three LO signals are offset by 120 degrees from each other, and each of the three LO signals is of a duty cycle of about 33.33%, and producing, based on the six phase signals and the three LO signals, second RF signals generated by the second mixer.

In accordance with yet another embodiment, a radio frequency (RF) system comprises a local oscillator (LO) generator configured to generate a plurality of LO signals, a first mixer configured to receive six phase signals offset by 60 degrees from each other and six LO signals generated by the LO generator, the first mixer being configured to operate in a six-phase mode in which the six phase signals are mixed with the six LO signals to generate first RF signals, and a second mixer configured to receive the six phase signals and three LO signals generated by the LO generator, the second mixer being configured to operate in a three-phase mode in which the six phase signals are mixed with the three LO signals to generate second RF signals.

The system further comprises a third mixer configured to receive the six phase signals and six LO signals. The third mixer is configured to operate in the six-phase mode in which the six phase signals are mixed with the six LO signals to generate third RF signals, wherein the first RF signals are in a low frequency band, the second RF signals are in an ultra-high frequency band, and the third RF signals are in a high frequency band.

The local oscillator comprises a voltage controlled oscillator (VCO) configured to generate a VCO signal, and a frequency LO generator configured to produce the plurality of LO signals.

The system further comprises an IQ source configured to provide digital I and Q signals, an IQ-to-3 phase converter configured to convert the digital I and Q signals to first, second and third phase digital signals, first, second, and third digital-to-analog converters (DACs) configured to convert the first, second and third phase digital signals into first, second, and third differential pairs of analog signals, and first, second, and third filters configured to filter the first, second, and third differential pairs of analog signals and generate the six phase signals.

The system further comprises a single-ended PA coupled to outputs of the first mixer.

An advantage of an embodiment of the present disclosure is a hybrid mixer that includes both a three-phase mixer and a six-phase mixer. The six-phase mixer is employed to eliminate or reduce the distortions in a RF system. The three-phase mixer is employed to reduce the power consumption of the RF system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 15 illustrates a flow chart of a method for reducing distortions in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a hybrid mixer for improving the performance of a wireless network comprising a plurality of wireless devices (e.g., mobile phones) and a plurality of base stations. The hybrid mixer comprises a first mixer configured to operate in a six-phase mode to eliminate or reduce distortions in the RF system. The hybrid mixer further comprises a second mixer configured to operate in a three-phase mode to reduce power consumption in the RF system. The present disclosure may also be applied, however, to a variety of radio frequency (RF) systems. Hereinafter, various embodiments will be explained in detail with reference to the accompanying drawings.

Figure 1:
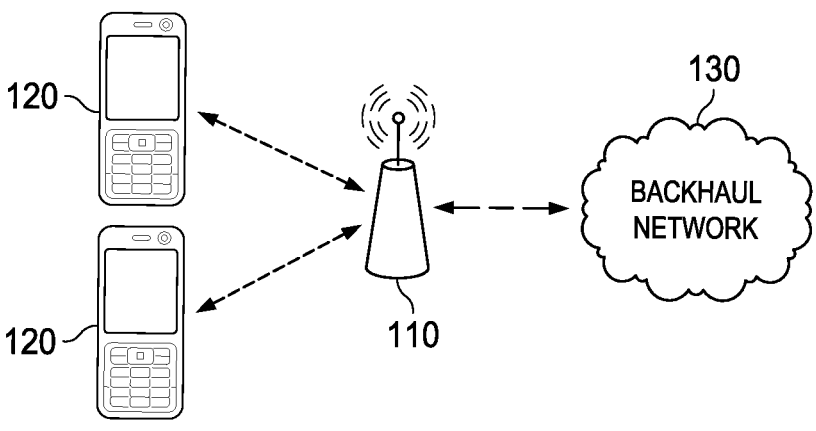
FIG. 1 illustrates an exemplary wireless network in accordance with various embodiments of the present disclosure.

FIG. 1 illustrates an exemplary wireless network in accordance with various embodiments of the present disclosure. The wireless network 100 comprises a base station 110, a plurality of mobile devices 120, and a backhaul network 130. The mobile device 100 may be implemented as any suitable end user device such as a user equipment/device, a wireless transmit/receive unit, a mobile station, a notebook computer, a mobile phone, a personal digital assistant (PDA), a media player, a gaming device, a wireless sensor, a wearable device and/or the like. The mobile device 100 may comprise a receiver, a transmitter, antennas and other suitable components. Throughout the description, the mobile device may be alternatively referred to as user equipment (UE).

The base station may refer to any component (or collection of components) configured to provide wireless access to a wireless network. The base station may be implemented as a base transceiver station (BTS), a Node-B (NodeB), an evolved NodeB (eNB), a fifth generation (5G) NodeB, a Home NodeB, a macro-cell, a femtocell, an access point (AP), or other wirelessly enabled devices.

As shown in FIG. 1, the base station 110 establishes uplink and/or downlink connections (dashed lines) with the mobile devices 120, which serve to carry data from the mobile devices 120 to the base station 110 and vice-versa.

Data carried over the uplink/downlink connections may include data communicated between the mobile devices 120, as well as data communicated to/from a remote-end (not shown) by way of the backhaul network 130.

The mobile device 100 may transmit and receive wireless signals modulated based upon various communication protocols such as such as Global System for Mobile Communications (GSM), Universal Mobile Telecommunications System (UMTS), Long Term Evolution (LTE), LTE Advanced (LTE-A), LTE Multimedia Broadcast Multicast Service (MBMS). In addition, the wireless signals may be modulated based upon other standards such as Worldwide Interoperability for Microwave Access (WiMAX), Wireless Local Area Network (WLAN), Ultra-Wideband (UWB) and the like. Furthermore, the base station and the mobile device may be configured to implement other suitable wireless protocols.

In some embodiments, the mobile device 120 and the base station use a hybrid transmitter and/or a hybrid receiver for performing transmissions. More particularly, the mixers of the hybrid transmitter and/or the hybrid receiver may be configured to operate in multiple ("hybrid") modes. In particular, the mixer may be controlled to operate as a three-phase mixer or a six-phase mixer. When operating as a six-phase mixer, the hybrid transmitter/receiver consumes more power but may also eliminate or reduce distortions in the RF system. When operating as a three-phase transmitter, the hybrid transmitter/receiver consumes less power.

The three-phase operation may be performed in situations where distortion requirements are relaxed, and the six-phase operation may be performed in situations where tight distortion requirements are needed. The distortion requirements for a transmission may be determined based on whether a protected frequency band is adjacent to the transmitted frequency of the mixer. When the frequency band is not adjacent to the transmitted frequency of a mixer, the distortion requirements are relaxed. The three-phase operation may be performed in the mixer for reducing power consumption. Throughout the description, the six-phase operation may be alternatively referred to as the six-phase operating mode. The three-phase operation may be alternatively referred to as the six-phase operating mode.

Figure 2:
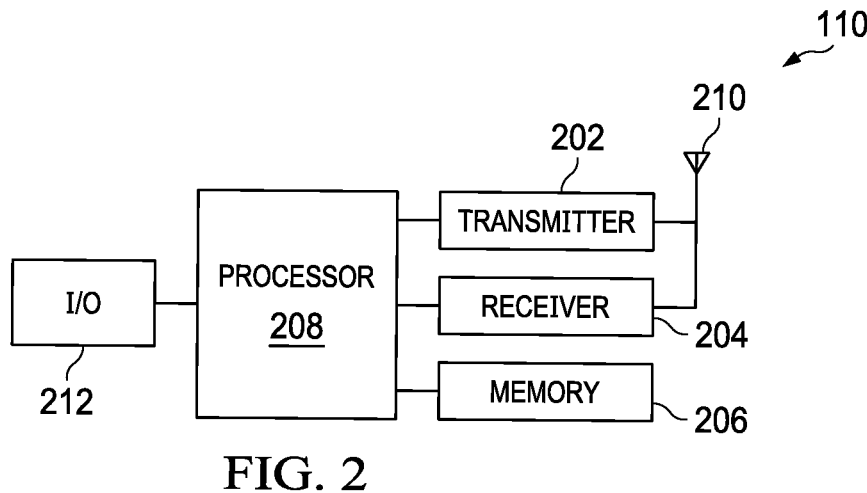
FIG. 2 illustrates a block diagram of a UE shown in FIG. 1 in accordance with various embodiments of the present disclosure.

FIG. 2 illustrates a block diagram of a UE shown in FIG. 1 in accordance with various embodiments of the present disclosure. The UE 110 may be implemented as a mobile phone, but may be any suitable wireless devices as described above with respect to FIG. 1. As shown in FIG. 2, the UE 110 includes a transmitter 202, a receiver 204, a memory 206, a processor 208, an input/output device 212 and an antenna 210. It should be noted for simplicity FIG. 2 only illustrates relevant components of the UE 110. The UE 100 may comprise other suitable components. Furthermore, while FIG. 2 illustrates one element (e.g., one processor 208), the UE 110 may accommodate any number of such elements.

The processor 208 can implement various processing operations of the UE 110. For example, the processor 208 can perform signal coding, data processing, power control, input/output processing and the like. The processor 208 may include any suitable processing or computing devices configured to perform one or more operations. For example, the processor 208 may include a microprocessor, a microcontroller, a digital signal processor, a field programmable gate array, an application specific integrated circuit and the like. The memory 206 may be implemented as non-transitory memory storage.

The transmitter (TX) 202 is configured to modulate data or other content for transmission by the antenna 210. Prior to feeding signals to the antenna 210 for transmission, the transmitter 202 may receive a baseband digital signal, convert the baseband digital signal into an analog signal, filter the analog signal, up-convert the filtered analog signal to a radio frequency signal, and amplify the radio frequency signal. The amplified radio frequency signal is transmitted by the antenna 210.

The receiver (RX) 204 is configured to demodulate data or other content received by the antenna 210. The receiver 204 is configured to receive the RF signal from the antenna 210, amplify the RF signal, down-convert the RF signal to a baseband frequency analog signal, filter the baseband frequency analog signal, convert the filtered baseband frequency analog signal into a baseband digital signal. The baseband digital signal is sent to a baseband processor for further processing to output voice or data. The receiver 204 can include any suitable structures for processing signals received wirelessly. The antenna 210 can include any suitable structure for transmitting and/or receiving wireless signals. The same antenna 210 can be used for both transmitting and receiving RF signals, or alternatively, different antennas 210 can be used for transmitting signals and receiving signals.

It is appreciated that one or multiple transmitters 202 could be used in the UE 110, one or multiple receivers 204 could be used in the UE 110, and one or multiple antennas 210 could be used in the UE 110. Although shown as separate blocks or components, at least one transmitter 202 and at least one receiver 204 could be combined into a transceiver. Accordingly, rather than showing a separate block for the transmitter 202 and a separate block for the receiver 204 in FIG. 2, a single block for a transceiver could have been shown.

The input/output devices 212 facilitate interaction with a user. The input/output device 212 includes any suitable structure for providing information to or receiving information from a user, such as a speaker, a microphone, a keypad, a keyboard, a display, a touch screen and any combinations thereof.

The memory 206 stores instructions and data used, generated, or collected by the UE 110. For example, the memory 206 could store software or firmware instructions executed by the processor 208. The memory 206 may be implemented as any suitable volatile and/or non-volatile storage and retrieval devices such as random access memory (RAM), read only memory (ROM), hard disk, optical disc, subscriber identity module (SIM) card, memory stick, secure digital (SD) memory card and the like.

Figure 3:
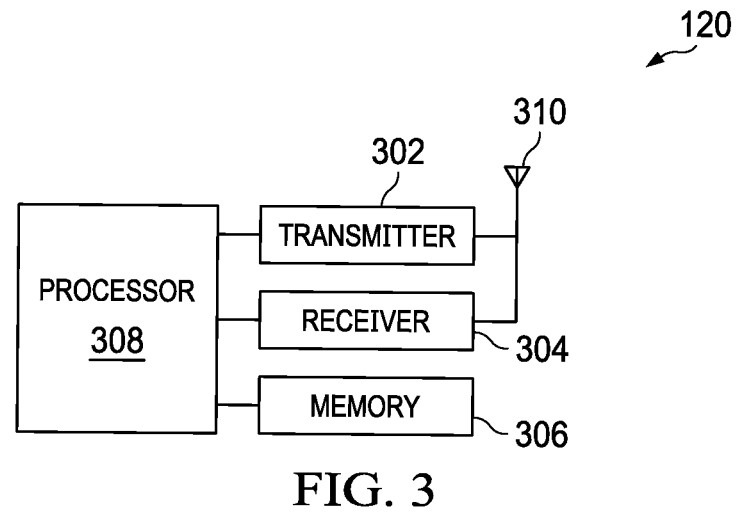
FIG. 3 illustrates a block diagram of the base station shown in FIG. 1 in accordance with various embodiments of the present disclosure.

FIG. 3 illustrates a block diagram of the base station shown in FIG. 1 in accordance with various embodiments of the present disclosure. The base station 120 includes a processor 308, a transmitter 302, a receiver 304, one or more antennas 310, and one memory 306. The processor 308 implements various processing operations such as signal coding, data processing, power control, input/output processing and the like. The processor 308 includes any suitable processing or computing device configured to perform one or more operations. The processor 308 may be implemented as a microprocessor, a microcontroller, a digital signal processor, a field programmable gate array, an application specific integrated circuit and the like. The memory 306 is non-transitory memory storage.

The transmitter 302 includes any suitable structure for generating signals for wireless transmission to one or more UEs 110 or other devices. The functions of the transmitter 302 are similar to the functions of the transmitter 202 shown in FIG. 2, and hence are not discussed herein. The receiver 304 includes any suitable structure for processing signals received wirelessly from one or more UEs 110 or other devices. The functions of the receiver 304 are similar to the functions of the receiver 204 shown in FIG. 2, and hence are not discussed herein. Although shown as separate blocks or components, the transmitter 302 and the receiver 304 could be combined into a transceiver. The antenna 310 includes any suitable structure for transmitting and/or receiving wireless signals. While FIG. 3 shows a common antenna 310 coupled to the transmitter 302 and the receiver 304, more antennas 310 could be employed depending on different design needs. The memory 306 may be implemented as any suitable volatile and/or non-volatile storage and retrieval devices.

Figure 4:
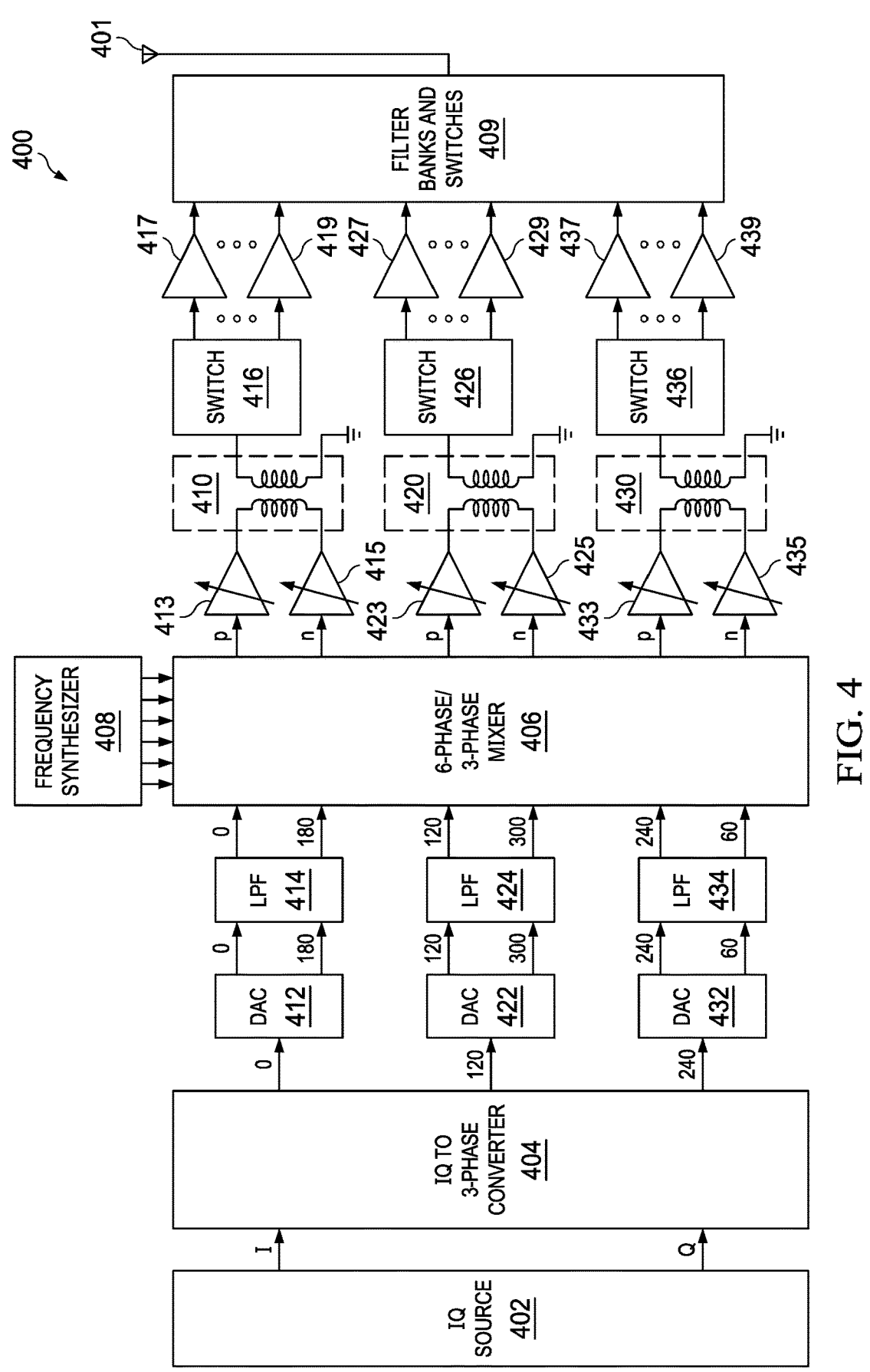
FIG. 4 illustrates a block diagram of a first implementation of the transmitter shown in FIGS. 2-3 in accordance with various embodiments of the present disclosure.

FIG. 4 illustrates a block diagram of a first implementation of the transmitter shown in FIGS. 2-3 in accordance with various embodiments of the present disclosure. In some embodiments, the transmitter 400 may be used in the UE shown in FIG. 2. Alternatively, the transmitter 400 may be used in the base station shown in FIG. 3. Furthermore, the transmitter 400 may be used in any suitable radio frequency systems.

As shown in FIG. 4, the transmitter 400 comprises an IQ source 402, an IQ to 3-phase converter 404, digital-to-analog converters (DACs) 412, 422, and 432, low pass filters (LPFs) 414, 424, and 434, a 6-phase/3-phase mixer 406, variable gain amplifiers (VGAs) 413, 415, 423, 425, 433, and 435, transformers 410, 420, and 430, switches 416, 426, and 436, power amplifiers (PAs) 417, 419, 427, 429, 437, and 439, a filter 409, an antenna 401, and a frequency synthesizer 408.

The IQ source 402 is configured to provide a digital in-phase (I) signal and a digital quadrature-phase (Q) signal that are 90 degrees offset from one another. More particularly, the IQ source 402 receives digital input signals and converts the input signals into the digital in-phase signal and the digital quadrature-phase signal. In some embodiments, the digital input signals can be voice and/or data signals. Prior to being converted into the digital in-phase signal and the digital quadrature-phase signal, these voice/data signals may pass through some suitable signal processing stages such as frequency conversion, amplification and the like.

As shown in FIG. 4, the digital in-phase signal and the digital quadrature-phase signal are fed into the IQ to 3-phase converter 404. The IQ to 3-phase converter 404 converts the digital in-phase signal and the digital quadrature-phase signal into a first phase digital signal, a second phase digital signal and a third phase digital signal.

As shown in FIG. 4, the first phase digital signal is offset in phase from the digital in-phase signal by 0 degrees. The first phase digital signal may be alternatively referred to as a 0-degree phase signal. The second phase digital signal is offset in phase from the digital in-phase signal by 120 degrees. The second phase digital signal may be alternatively referred to as a 120-degree phase signal. The third phase digital signal is offset in phase from the digital in-phase signal by 240 degrees. The third phase digital signal may be alternatively referred to as a 240-degree phase signal. The structure and operating principle of the IQ to 3-phase converter 404 will be described below in detail with respect to FIG. 8.

Each of the DACs has a single-ended input and differential outputs. At each of the DACs, two output differential analog signals are generated. These two output differential analog signals are 180 degrees offset from one another, one of which can be referred to as a positive (P) signal, and the other of which can be referred to as a negative (N) signal.

As shown in FIG. 4, the first phase digital signal is fed into a first DAC 412. Through the first DAC 412, the first phase digital signal is converted into two baseband analog signals offset by 180 degrees from each other (0 degrees and 180 degrees, respectively as shown in FIG. 4). Likewise, the second phase digital signal is fed into a second DAC 422. Through the second DAC 422, the second phase digital signal is converted into two baseband analog signals offset by 180 degrees from each other (120 degrees and 300 degrees, respectively as shown in FIG. 4). The third phase digital signal is fed into a third DAC 432. Through the third DAC 432, the third phase digital signal is converted into two baseband analog signals offset by 180 degrees from each other (240 degrees and 60 degrees, respectively as shown in FIG. 4).

Through the three DACs, the first phase digital signal, the second phase digital signal and the third phase digital signal are converted into six baseband analog signals offset by 60 degrees from each other as shown in FIG. 4. Throughout the description, these six baseband analog signals may be alternatively referred to as the phase baseband signals. These six baseband analog signals are fed into the 6-phase/3-phase mixer 406 through LPFs 414, 424 and 434. The LPFs 414, 424 and 434 are employed to attenuate undesirable frequency components generated in the digital to analog conversions.

The frequency synthesizer 408 is a local oscillator (LO) generator. The frequency synthesizer 408 is able to generate a plurality of LO signals for the 6-phase/3-phase mixer 406. The 6-phase/3-phase mixer 406 may comprise a plurality of mixers. In some embodiments, at least one mixer of the 6-phase/3-phase mixer 406 is configured to operate in a six-phase operating mode to reduce the distortions of the transmitter 400. On the other hand, at least one mixer of the 6-phase/3-phase mixer 406 is configured to operate in a three-phase operating mode to reduce power consumption of the transmitter 400.

In response to the three-phase operating mode, the frequency synthesizer 408 is configured to generate three LO signals (e.g., a 5 GHz LO signal). The three LO signals include a 0-degree LO signal, a 120-degree LO signal that is offset from the 0-degree LO signal by 120 degrees, and a 240-degree LO signal that is offset from the 0-degree LO signal by 240 degrees. These three LO signals have a same frequency (e.g., 5 GHz) and a same duty cycle (e.g., 33.33%).

In response to the six-phase operating mode, the frequency synthesizer 408 is configured to generate six LO signals (e.g., a 5 GHz LO signal). The six LO signals include a 0-degree LO signal, a 120-degree LO signal that is offset from the 0-degree LO signal by 120 degrees, a 240-degree LO signal that is offset from the 0-degree LO signal by 240 degrees, a 60-degree LO signal that is offset from the 0-degree LO signal by 60 degrees. A 180-degree LO signal that is offset from the 0-degree LO signal by 180 degrees. A 300-degree LO signal that is offset from the 0-degree LO signal by 300 degrees. These six LO signals have a same frequency (e.g., 5 GHz) and a same duty cycle (e.g., 16.67%). The detailed structure of the frequency synthesizer 408 will be described below with respect to FIG. 7.

The 6-phase/3-phase mixer 406 may comprise a plurality of mixers. The 6-phase/3-phase mixer 406 is configured to receive the six baseband analog signals as well as the LO signals generated by the frequency synthesizer 408. In some embodiments, the 6-phase/3-phase mixer 406 comprises a first mixer configured to generate radio frequency signals in a low frequency band, a second mixer configured to generate radio frequency signals in an ultra-high frequency band, a third mixer configured to generate radio frequency signals in a high frequency band.

In some embodiments, a protected frequency band is located adjacent to a first transmitting frequency of the first radio frequency signals generated by the first mixer. The protected frequency band is away from a second transmitting frequency of the second radio frequency signals generated by the second mixer. In order to prevent the distortions of the transmitter from causing interference to the protected frequency band, the first mixer is configured to operate in a six-phase operating mode to eliminate or reduce the distortion. On the other hand, since the protected frequency band is away from the second transmitting frequency of the second mixer, the second mixer is configured to operate in a three-phase operating mode to reduce power consumption.

In this disclosure, the six-phase operating mode is able to eliminate or reduce the distortions of the transmitter. This advantage will be described in detail with respect to FIG. 13. In this embodiment, the protected frequency band can be a frequency band owned by one wireless carrier of two wireless carriers operate in a same region. For example, a first wireless carrier owns a frequency band from 4.0 GHz to 4.5 GHz. A second wireless carrier owns a frequency band from 4.5 GHz to 5.0 GHz. To the first carrier, a frequency band (e.g., a band around 4.51 GHz) owned by the second wireless carrier is a protected frequency band. High level interference (e.g., distortions from the wireless devices of the first wireless carrier) to this frequency band is prohibited.

In some embodiments, the 6-phase/3-phase mixer 406 comprises three mixers. A first mixer is configured to operate in the six-phase operating mode. The first mixer is configured to receive the six baseband analog signals and six LO signals, and up-convert the six baseband analog signals to generate first radio frequency signals in a low frequency band. A second mixer is configured to operate in the three-phase operating mode. The second mixer is configured to receive the six baseband analog signals and three LO signals, and up-convert the six baseband analog signals to generate second radio frequency signals in an ultra-high frequency band. A third mixer is configured to operate in the six-phase operating mode. The third mixer is configured to receive the six baseband analog signals and the six LO signals, and up-convert the six baseband analog signals to generate third radio frequency signals in in a high frequency band. The detailed structure of the 6-phase/3-phase mixer 406 will be described below with respect to FIG. 9.

The first radio frequency signals are fed into VGAs 413 and 415. The VGAs 413 and 415 are employed to adjust the amplitude of the first radio frequency signals to a predetermined level. The output of VGA 413 is connected to a first terminal of a primary winding of the transformer 410. The output of VGA 415 is connected to a second terminal of the primary winding of the transformer 410. Through the transformer 410, the differential signals from the 6-phase/3-phase mixer 406 are converted into a single-ended signal.

The single-ended signal from a secondary winding of the transformer 410 is fed into the switch 416. Depending on different frequencies, the signal-ended signal may be routed into different PA (e.g., PA 417 and 419). The outputs of the PAs are fed into the antenna 401 through the filter 409. The filter 409 may comprise a plurality of filter banks and switches as shown in FIG. 4. The filter 409 is employed to attenuate undesirable frequency components and route the proper signals to the antenna.

The second radio frequency signals are fed into VGAs 423 and 425. The VGAs 423 and 425 are employed to adjust the amplitude of the second radio frequency signals to a predetermined level. The output of VGA 423 is connected to a first terminal of a primary winding of the transformer 420. The output of VGA 425 is connected to a second terminal of the primary winding of the transformer 420. Through the transformer 420, the differential signals from the 6-phase/3-phase mixer 406 are converted into a single-ended signal.

The signal-ended signal from a secondary winding of the transformer 420 is fed into the switch 426. Depending on different frequencies, the signal-ended signal may be routed into different PA (e.g., PA 427 and 429). The outputs of the PAs are fed into the antenna 401 through the filter 409. The filter 409 is employed to attenuate undesirable frequency components and route the proper signals to the antenna.

The third radio frequency signals are fed into VGAs 433 and 435. The VGAs 433 and 435 are employed to adjust the amplitude of the third radio frequency signals to a predetermined level. The output of VGA 433 is connected to a first terminal of a primary winding of the transformer 430. The output of VGA 435 is connected to a second terminal of the primary winding of the transformer 430. Through the transformer 430, the differential signals from the 6-phase/3-phase mixer 406 are converted into a single-ended signal.

The signal-ended signal from a secondary winding of the transformer 430 is fed into the switch 436. Depending on different frequencies, the signal-ended signal may be routed into different PA (e.g., PA 437 and 439). The outputs of the PAs are fed into the antenna 401 through the filter 409. The filter 409 is employed to attenuate undesirable frequency components and route the proper signals to the antenna.

Figure 5:
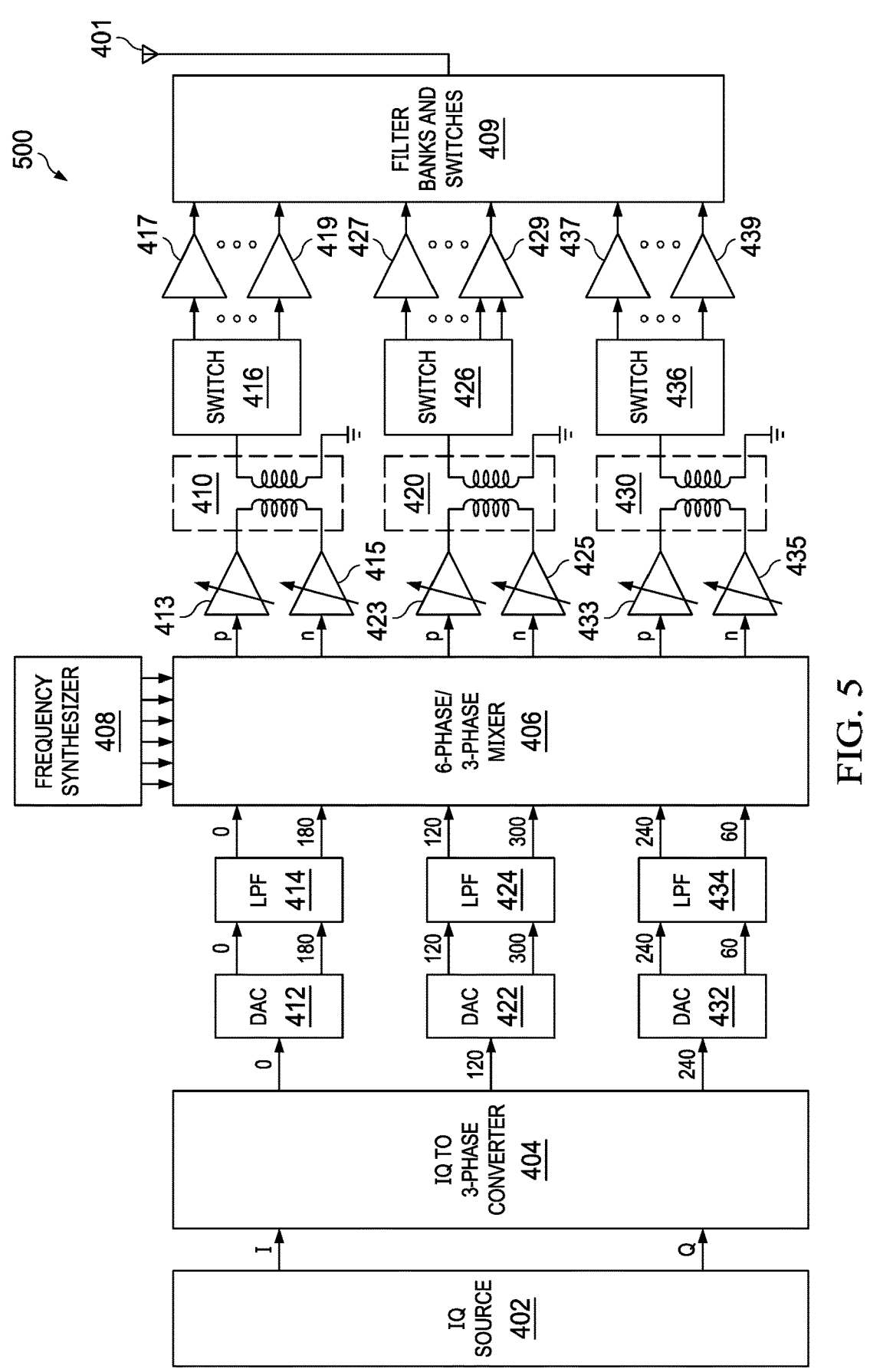
FIG. 5 illustrates a block diagram of a second implementation of the transmitter shown in FIGS. 2-3 in accordance with various embodiments of the present disclosure.

FIG. 5 illustrates a block diagram of a second implementation of the transmitter shown in FIGS. 2-3 in accordance with various embodiments of the present disclosure. The transmitter 500 shown in FIG. 5 is similar to that shown in FIG. 4 except that a differential PA is employed to attenuate the distortions. In some embodiments, the protected frequency band is located adjacent to the second transmitting frequency of the second RF signals generated by the second mixer. The second mixer is configured to operate in the three-phase operating mode for reducing power consumption. In order to prevent the distortions from causing interference to the protected frequency band, the differential PA (e.g., PA 429) is employed. More particularly, through the differential operation, the differential PA is able to cancel the second order counter intermodulation (CIM2) distortion generated from the second order non-linearity of the PA. As a result of having the differential PA (e.g., PA 429), the CIM2 distortion at the antenna 401 has been reduced.

Figure 6:
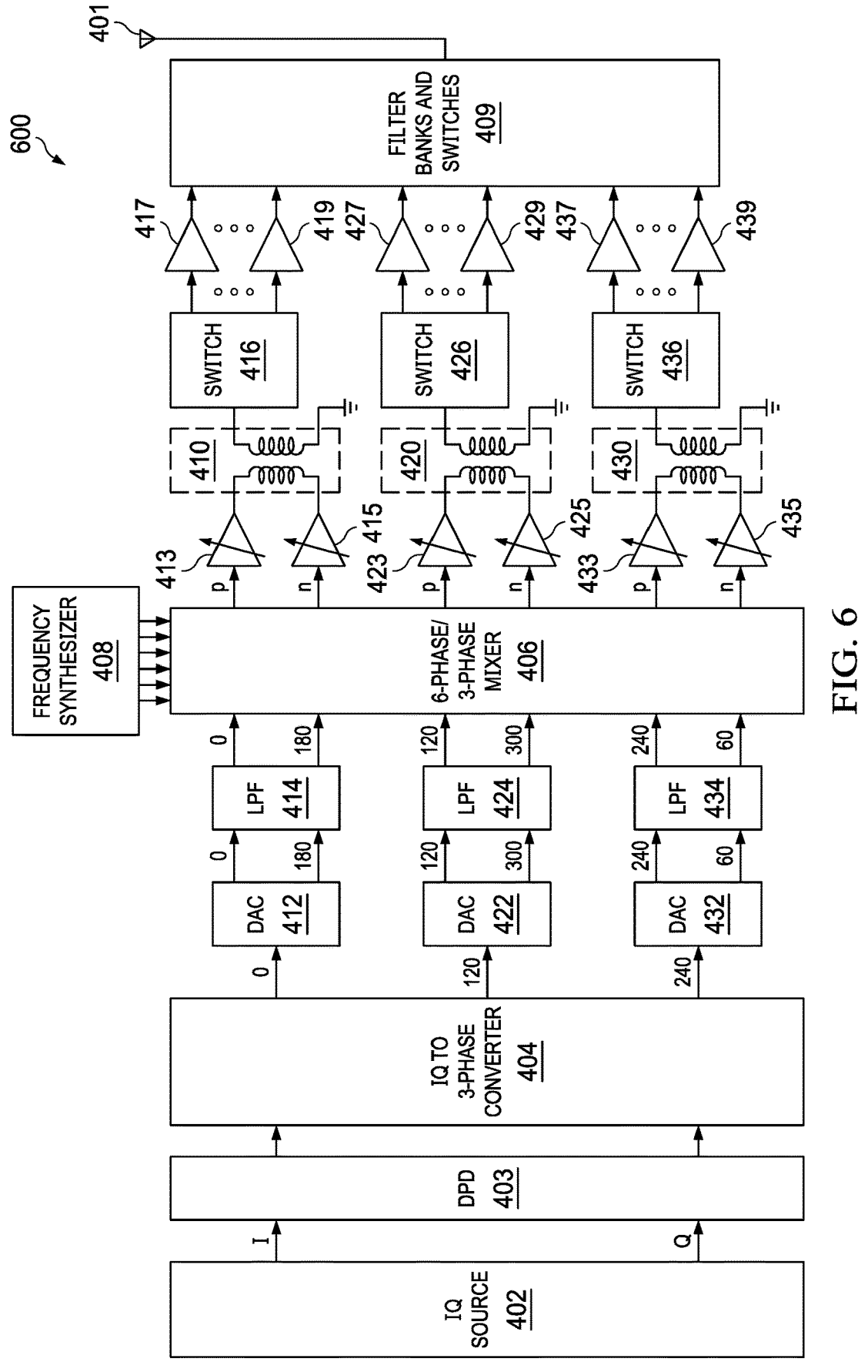
FIG. 6 illustrates a block diagram of a third implementation of the transmitter shown in FIGS. 2-3 in accordance with various embodiments of the present disclosure.

FIG. 6 illustrates a block diagram of a third implementation of the transmitter shown in FIGS. 2-3 in accordance with various embodiments of the present disclosure. The transmitter 600 shown in FIG. 6 is similar to that shown in FIG. 4 except that a digital pre-distortion (DPD) algorithm has been enabled to reduce a CIM2 component. In some embodiments, the protected frequency band is located adjacent to the second transmitting frequency of the second RF signals generated by the second mixer. The second mixer is configured to operate in the three-phase operating mode for reducing power consumption. In order to prevent the distortions from causing interference to the protected frequency band, a DPD function unit 403 is placed between the IQ source 400 and the IQ to 3-phase converter 404. More particularly, the DPD function unit 403 generates a digital signal having a same level but with inverted phase to the distortion signal. In the digital signal path, the digital signal generated by the DPD and the distortion signal cancel each other out. As a result of having the DPD algorithm, the CIM2 distortion at the antenna 401 has been reduced. Comparing to the traditional quadrature IQ system such as a four-phase system, this three-phase DPD is for reducing CIM2. In the four-phase system, the DPD is used to reduce CIM3. The DPD for reducing CIM2 requires a lower bandwidth and a lower digital sampling frequency than the DPD for reducing CIM3. Such a lower bandwidth and a lower digital sampling frequency may help to reduce the DPD power consumption.

Figure 7:
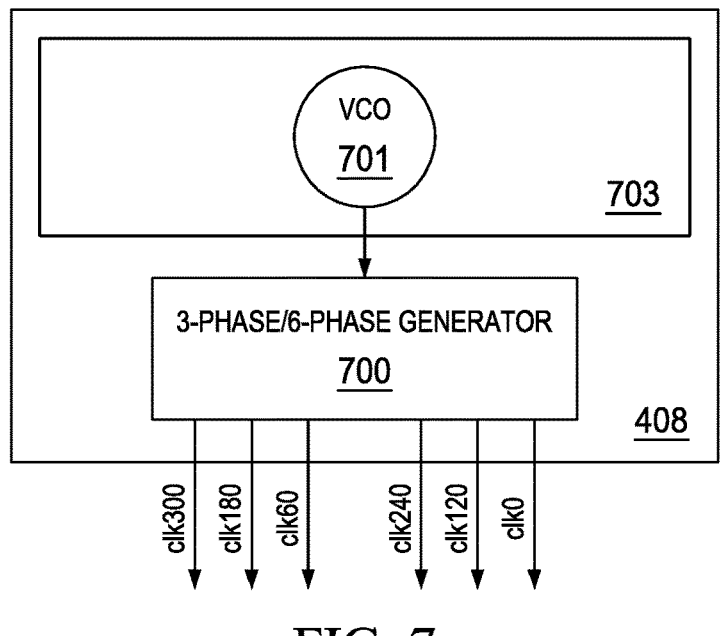
FIG. 7 is a block diagram of the frequency synthesizer shown in FIG. 4 in accordance with various embodiments of the present disclosure.

FIG. 7 is a block diagram of the frequency synthesizer shown in FIG. 4 in accordance with various embodiments of the present disclosure. The frequency synthesizer 408 comprises a voltage controlled oscillator (VCO) 701. The VCO 701 is part of a phase lock loop (PLL) 703. The VCO 701 is configured to generate a VCO signal. In some embodiments, the duty cycle of the VCO signal produced by the VCO 701 is about 50%.

The VCO signal produced by the VCO 701 is fed into the 3-phase/6-phase generator 700. The 3-phase/6-phase generator 700 functions as a LO generator. When a mixer is configured to operate in a three-phase operating mode, the 3-phase/6-phase generator 700 is configured to produce a first LO signal clk0, a second LO signal clk120 and a third LO signal clk240. These three LO signals has the same frequency (e.g., 5 GHz) and a same duty cycle (e.g., 33.33%). The first LO signal clk0 may be alternatively referred to as the 0-degree phase carrier signal. The second LO signal clk120 may be alternatively referred to as the 120-degree phase carrier signal that is offset from the 0-degree phase carrier signal by 120 degrees. The third LO signal clk240 may be alternatively referred to as the 240-degree phase carrier signal that is offset from the 0-degree phase carrier signal by 240 degrees. These three LO signals are fed into the mixer operating in the three-phase operating mode.

On the other hand, when a mixer is configured to operate in a six-phase operating mode, the 3-phase/6-phase generator 700 functions as a six-phase LO generator. More particularly, the six-phase LO generator is configured to produce a first LO signal clk0, a second LO signal clk120, a third LO signal clk240, a fourth LO signal clk60, a fifth LO signal clk 180 and a sixth LO signal clk300. These six LO signals has the same frequency (e.g., 5 GHz) and a same duty cycle (e.g., 16.67%).

The first LO signal clk0 may be alternatively referred to as the 0-degree phase carrier signal. The second LO signal clk120 may be alternatively referred to as the 120-degree phase carrier signal that is offset from the 0-degree phase carrier signal by 120 degrees. The third LO signal clk240 may be alternatively referred to as the 240-degree phase carrier signal that is offset from the 0-degree phase carrier signal by 240 degrees. The fourth LO signal clk60 may be alternatively referred to as the 60-degree phase carrier signal that is offset from the 0-degree phase carrier signal by 60 degrees. The fifth LO signal clk180 may be alternatively referred to as the 180-degree phase carrier signal that is offset from the 0-degree phase carrier signal by 180 degrees. The sixth LO signal clk300 may be alternatively referred to as the 300-degree phase carrier signal that is offset from the 0-degree phase carrier signal by 300 degrees. These six LO signals are fed into the mixer operating in the six-phase operating mode.

Figure 8:
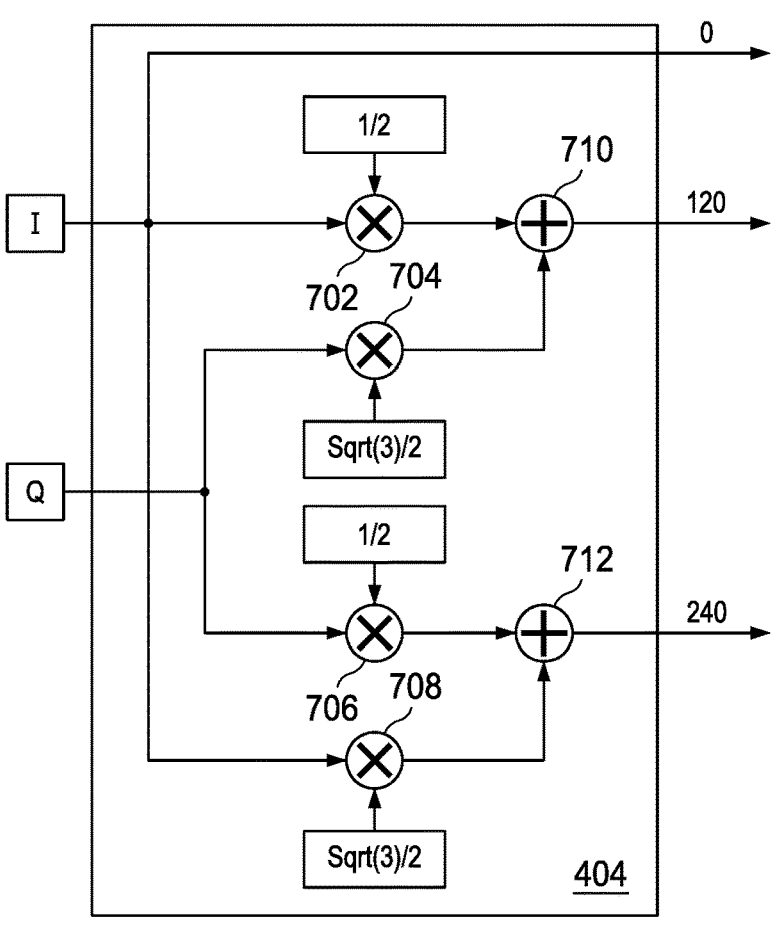
FIG. 8 illustrates a block diagram of the IQ to 3-phase converter shown in FIG. 4 in accordance with various embodiments of the present disclosure.

FIG. 8 illustrates a block diagram of the IQ to 3-phase converter shown in FIG. 4 in accordance with various embodiments of the present disclosure. The IQ to 3-phase converter 404 comprises mixers 702, 704, 706, and 708, and summers 710 and 712. The digital I signal is used to provide the 0-degree phase signal. The digital I signal is also fed into the mixer 702, which weights that digital I signal by multiplying it by ½. The digital I signal is additionally fed into the mixer 708, where it is weighted by the square-root of 3, divided by 2.

The digital Q signal is fed into the mixer 704, where it is weighted by the square-root of 3, divided by 2. The digital Q signal is also fed into the mixer 706 where it is weighted by ½. The outputs of the mixers 702 and 704 are added by the summer 710 to produce the 120-degree phase signal. The outputs of the mixers 706 and 708 are added by the summer 712 to produce the 240-degree phase signal.

It should be noted that the implementation of the IQ to 3-phase converter shown in FIG. 8 is merely an example. Other techniques for providing an IQ to 3-phase converter are also possible, and within the scope of the embodiments described herein.

Figure 9:
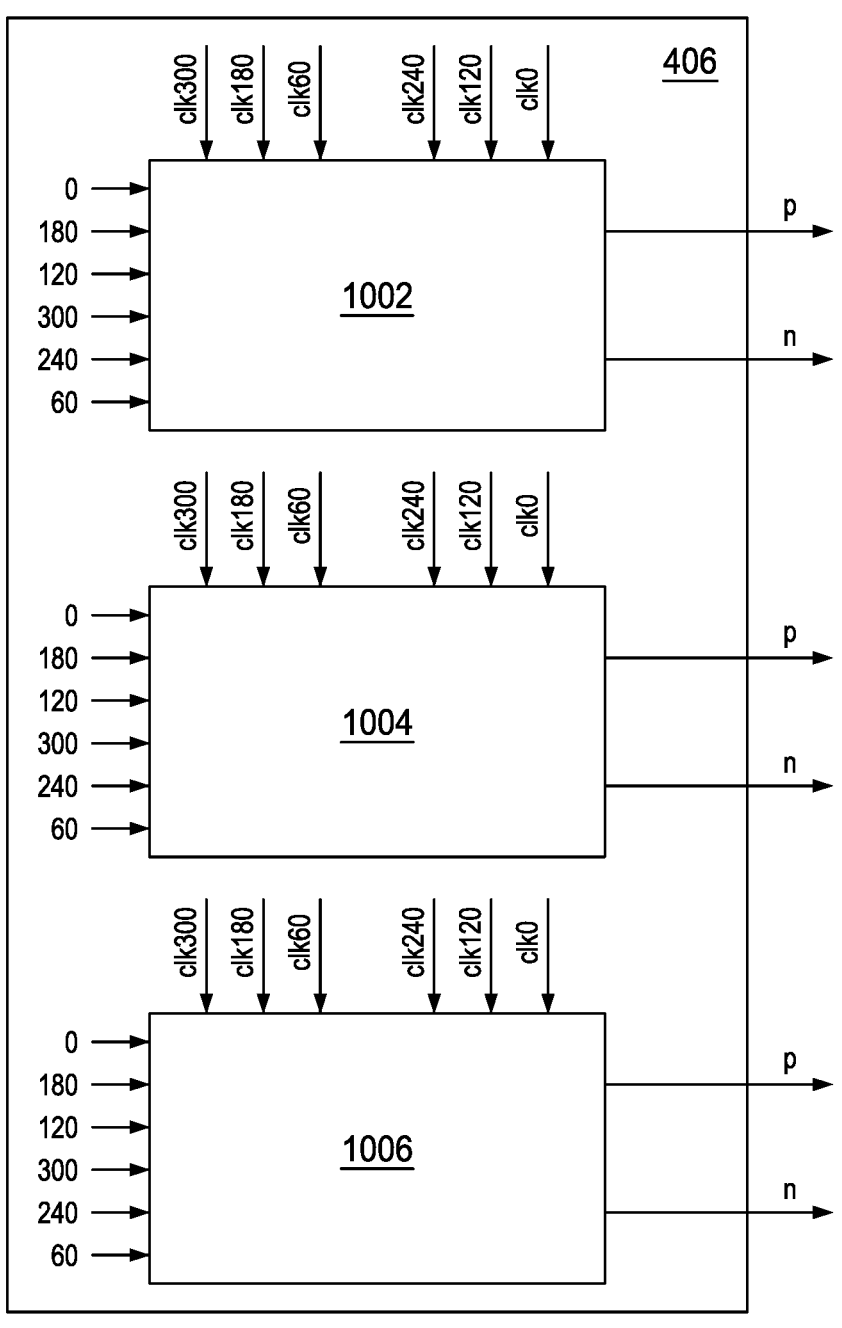
FIG. 9 illustrates a block diagram of the 6-phase/3-phase mixer shown in FIG. 4 in accordance with various embodiments of the present disclosure.

FIG. 9 illustrates a block diagram of the 6-phase/3-phase mixer shown in FIG. 4 in accordance with various embodiments of the present disclosure. The 6-phase/3-phase mixer 406 comprises a first mixer 1002, a second mixer 1004 and a third mixer 1006. Each of these three mixers is configured to receive six baseband analog signals (0, 180, 120, 300, 240 and 60 shown in FIG. 9) and six LO signals (clk0, clk120, clk240, clk60, clk180 and clk300). The six baseband analog signals have been discussed above with respect to FIG. 4, and hence are not discussed again. The six LO signals have been discussed above with respect to FIG. 7, and hence are not discussed again.

In operation, in each mixer, the baseband analog signals and the LO signals are mixed to generate radio frequency signals. In some embodiments, for reducing the distortions of the transmitter, the first mixer 1002 and the third mixer 1006 are configured to operate in a six-phase operating mode. On the other hand, for reducing power consumption of the transmitter, the second mixer 1004 is configured to operate in a three-phase operating mode.

In operation, the first mixer 1002 is configured to operate in the six-phase mode. The first mixer 1002 functions as a six-phase mixer. The structure and the operating principle of the six-phase mixer will be described below with respect to FIG. 11.

In response to the six-phase mode, the first mixer 1002 is configured to receive the six baseband analog signals and the six LO signals. In the first mixer 1002, the six baseband analog signals are mixed with the six LO signals to generate first RF signals. The first RF signals are in a low frequency band.

The second mixer 1004 is configured to operate in the three-phase mode. The second mixer 1004 functions as a three-phase mixer. The structure and the operating principle of the three-phase mixer will be described below with respect to FIG. 10.

In response to the three-phase mode, the second mixer 1004 is configured to receive the six baseband analog signals and three LO signals (clk0, clk120 and clk240). In the second mixer 1004, the six baseband analog signals are mixed with the three LO signals to generate second RF signals. The second RF signals are in an ultra-high frequency band. In other words, a second transmitting frequency of the second RF signals processed by the second mixer 1004 is higher than a first transmitting frequency of the first RF signals processed by the first mixer 1002.

Furthermore, the third mixer 1006 is configured to operate in the six-phase mode. The third mixer 1006 functions as a six-phase mixer. In response to the six-phase mode, the third mixer 1006 is configured to receive the six baseband analog signals and the six LO signals. In the third mixer 1006, the six baseband analog signals are mixed with the six LO signals to generate third RF signals. The third RF signals are in a high frequency band. In other words, a third transmitting frequency of the third RF signals processed by the third mixer 1006 is between the first transmitting frequency of the first RF signals processed by the first mixer 1002 and the second transmitting frequency of the second RF signals processed by the second mixer 1004.

Figure 10:
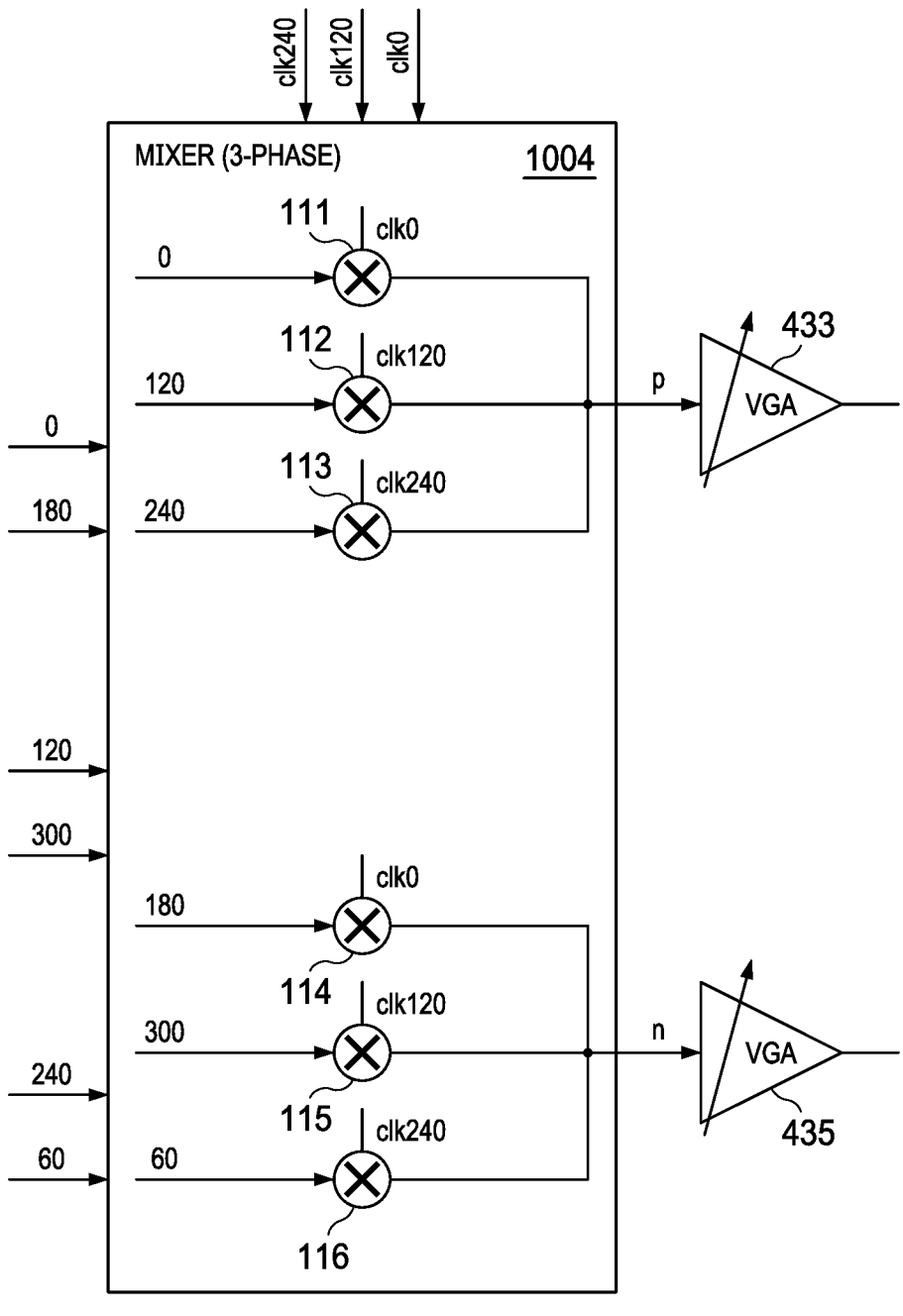
FIG. 10 illustrates a schematic diagram of a three-phase mixer in accordance with various embodiments of the present disclosure.

FIG. 10 illustrates a schematic diagram of a three-phase mixer in accordance with various embodiments of the present disclosure. The three-phase mixer comprises mixer 111-116. A first baseband analog signal (offset in phase from the digital in-phase signal by 0 degrees) and a first LO signal clk0 are fed into the mixer 111. The mixer 111 up-converts the frequency of the first baseband analog signal based on the first LO signal to generate a first p-type RF signal. A second baseband analog signal (offset in phase from the digital in-phase signal by 180 degrees) and the first LO signal clk0 are fed into the mixer 114. The mixer 114 up-converts the frequency of the second baseband analog signal based on the first LO signal to generate a first n-type RF signal.

A third baseband analog signal (offset in phase from the digital in-phase signal by 120 degrees) and a second LO signal clk120 are fed into the mixer 112. The mixer 112 up-converts the frequency of the third baseband analog signal based on the second LO signal to generate a second p-type RF signal. A fourth baseband analog signal (offset in phase from the digital in-phase signal by 300 degrees) and the second LO signal clk120 are fed into the mixer 115. The mixer 115 up-converts the frequency of the fourth baseband analog signal based on the second LO signal to generate a second n-type RF signal.

A fifth baseband analog signal (offset in phase from the digital in-phase signal by 240 degrees) and a third LO signal clk240 are fed into the mixer 113. The mixer 113 up-converts the frequency of the fifth baseband analog signal based on the third LO signal to generate a third p-type RF signal. A sixth baseband analog signal (offset in phase from the digital in-phase signal by 60 degrees) and the third LO signal clk240 are fed into the mixer 116. The mixer 116 up-converts the frequency of the sixth baseband analog signal based on the third LO signal to generate a third n-type RF signal.

The first p-type RF signal generated by the mixer 11, the second p-type RF signal generated by the mixer 112 and the third p-type RF signal generated by the mixer 113 are combined together and fed into the VGA 433. The first n-type RF signal generated by the mixer 114, the second n-type RF signal generated by the mixer 115 and the third n-type RF signal generated by the mixer 116 are combined together and fed into the VGA 435.

Figure 11:
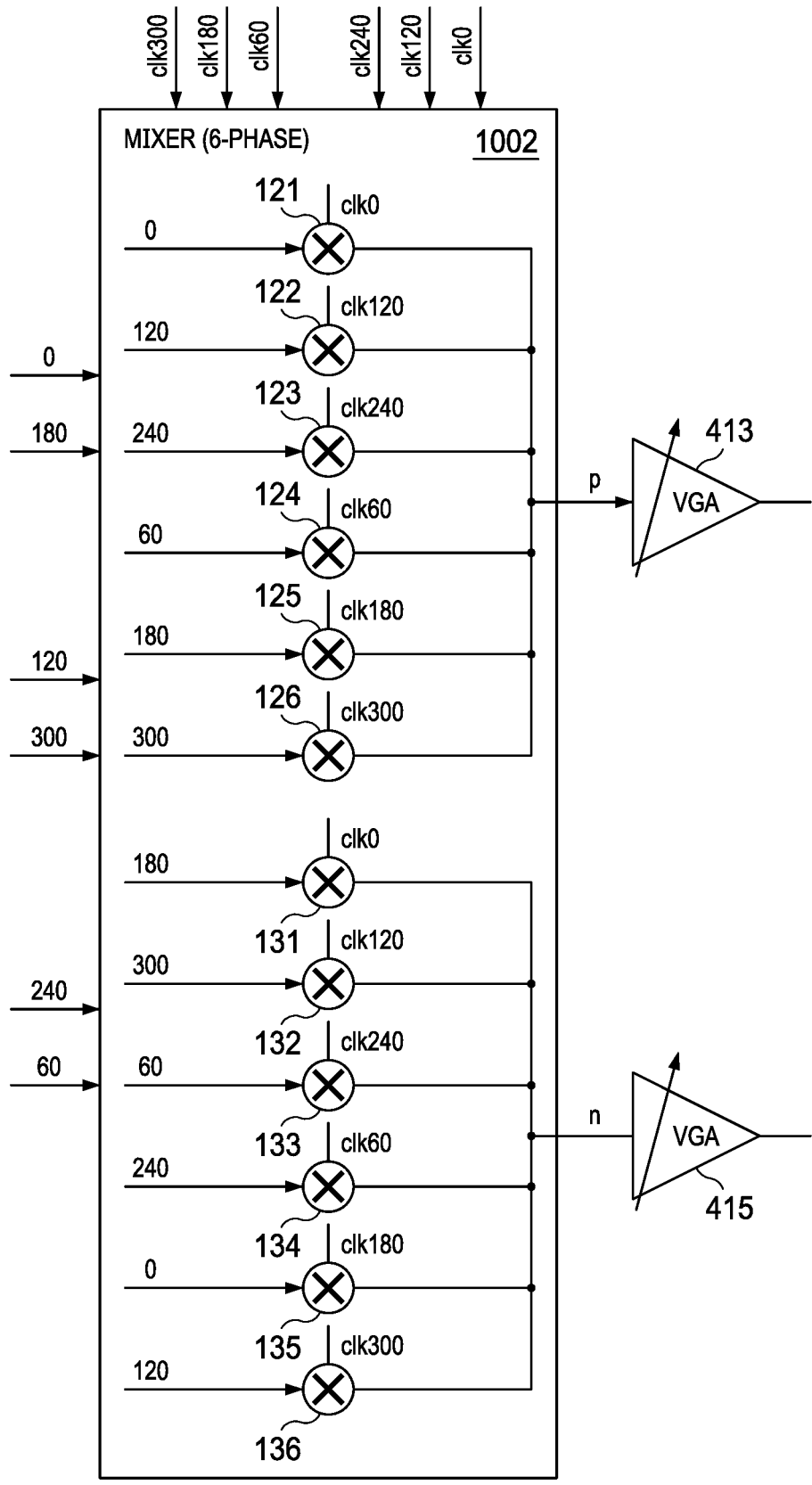
FIG. 11 illustrates a schematic diagram of a six-phase mixer in accordance with various embodiments of the present disclosure.

FIG. 11 illustrates a schematic diagram of a six-phase mixer in accordance with various embodiments of the present disclosure. The 6-phase mixer 1002 comprises mixer 121-126, and mixers 131-136. A first baseband analog signal (offset in phase from the digital in-phase signal by 0 degrees) and a first LO signal clk0 are fed into the mixer 121. The mixer 121 up-converts the frequency of the first baseband analog signal based on the first LO signal to generate a first p-type RF signal. A second baseband analog signal (offset in phase from the digital in-phase signal by 180 degrees) and the first LO signal clk0 are fed into the mixer 131. The mixer 131 up-converts the frequency of the second baseband analog signal based on the first LO signal to generate a first n-type RF signal.

A third baseband analog signal (offset in phase from the digital in-phase signal by 120 degrees) and a second LO signal clk120 are fed into the mixer 122. The mixer 122 up-converts the frequency of the third baseband analog signal based on the second LO signal to generate a second p-type RF signal. A fourth baseband analog signal (offset in phase from the digital in-phase signal by 300 degrees) and the second LO signal clk120 are fed into the mixer 132. The mixer 132 up-converts the frequency of the fourth baseband analog signal based on the second LO signal to generate a second n-type RF signal.

A fifth baseband analog signal (offset in phase from the digital in-phase signal by 240 degrees) and a third LO signal clk240 are fed into the mixer 123. The mixer 123 up-converts the frequency of the fifth baseband analog signal based on the third LO signal to generate a third p-type RF signal. A sixth baseband analog signal (offset in phase from the digital in-phase signal by 60 degrees) and the third LO signal clk240 are fed into the mixer 133. The mixer 133 up-converts the frequency of the sixth baseband analog signal based on the third LO signal to generate a third n-type RF signal.

The sixth baseband analog signal (offset in phase from the digital in-phase signal by 60 degrees) and a fourth LO signal clk60 are fed into the mixer 124. The mixer 124 up-converts the frequency of the sixth baseband analog signal based on the fourth LO signal to generate a fourth p-type RF signal. The fifth baseband analog signal (offset in phase from the digital in-phase signal by 240 degrees) and the fourth LO signal clk60 are fed into the mixer 134. The mixer 134 up-converts the frequency of the fifth baseband analog signal based on the fourth LO signal to generate a fourth n-type RF signal.

The second baseband analog signal (offset in phase from the digital in-phase signal by 180 degrees) and a fifth LO signal clk180 are fed into the mixer 125. The mixer 125 up-converts the frequency of the second baseband analog signal based on the fifth LO signal to generate a fifth n-type RF signal. The first baseband analog signal (offset in phase from the digital in-phase signal by 0 degrees) and the fifth LO signal clk180 are fed into the mixer 135. The mixer 135 up-converts the frequency of the first baseband analog signal based on the fifth LO signal to generate a fifth n-type RF signal.

The fourth baseband analog signal (offset in phase from the digital in-phase signal by 300 degrees) and a sixth LO signal clk300 are fed into the mixer 126. The mixer 126 up-converts the frequency of the fourth baseband analog signal based on the sixth LO signal to generate a sixth n-type RF signal. The third baseband analog signal (offset in phase from the digital in-phase signal by 120 degrees) and the sixth LO signal clk300 are fed into the mixer 136. The mixer 136 up-converts the frequency of the third baseband analog signal based on the sixth LO signal to generate a sixth p-type RF signal.

The first p-type RF signal generated by the mixer 121, the second p-type RF signal generated by the mixer 122, the third p-type RF signal generated by the mixer 123, the fourth p-type RF signal generated by the mixer 124, the fifth p-type RF signal generated by the mixer 125, the sixth p-type RF signal generated by the mixer 126 are combined together and fed into the VGA 413. The first n-type RF signal generated by the mixer 131, the second n-type RF signal generated by the mixer 132, the third n-type RF signal generated by the mixer 133, the fourth n-type RF signal generated by the mixer 134, the fifth n-type RF signal generated by the mixer 135, the sixth n-type RF signal generated by the mixer 136 are combined together and fed into the VGA 415.

Figures 12, 13:
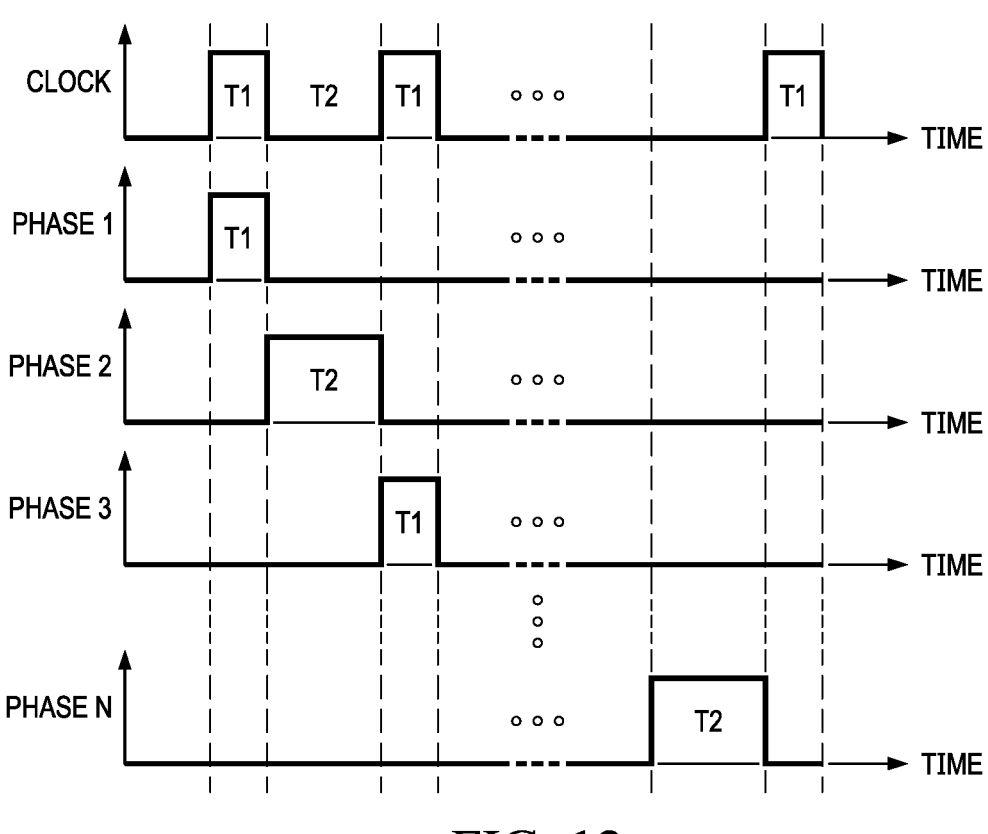
FIG. 12 illustrates a plurality of LO signals and accompanying duty cycle in accordance with various embodiments of the present disclosure.
FIG. 13 illustrates the generic square waveform in accordance with various embodiments of the present disclosure.

FIGS. 12 and 13 illustrate the concept of using a six-phase operating mode to reduce or eliminate distortions in the radio frequency system. This concept is useful in understanding why some mixers (e.g., first mixer 1002 shown in FIG. 9) are configured to operate in the six-phase operating mode.

FIG. 12 illustrates a plurality of LO signals and accompanying duty cycle in accordance with various embodiments of the present disclosure. In some embodiments, there are N LO signals. The LO frequency of each LO signal is denoted as fLO. The frequency of the clock is equal to fLO*N/2. The clock is generated from a VCO. Due to the VCO duty ratio error, the duty cycle of the clock may be not equal to 50%. As shown in FIG. 12, T1 is not equal to T2. The duty cycle of the clock is not equal to 50%. The associated N LO clock phases (Phase 1, Phase 2, . . . , Phase N) have an alternating pattern of the on-time to be T1 and T2 as shown in FIG. 12. To better understand the impact of the duty ratio error (shown in FIG. 12), a generic square waveform is used to analyze the distortions caused by the duty ratio error and why a six-phase operating mode is able to eliminate or reduce the distortions.

FIG. 13 illustrates the generic square waveform in accordance with various embodiments of the present disclosure. A generic square waveform with a duty ratio equal to $\alpha/\pi$ is shown in FIG. 13.

The signal between 0 and $2\pi$ can be expressed as:

$$f_{1\_0to2\pi}(x) = \begin{cases} 0, & x < \pi - \alpha \\ V, & \pi - \alpha \le x \le \pi + \alpha \\ 0, & \pi - \alpha < x < 2\pi \end{cases} \tag{1}$$

Based on the Fourier transformation, the fixed duty ratio square waveform can be written as:

$$f_1(x) = \frac{V*\alpha}{\pi} + V * \sum_{m=1}^{\infty} (-1)^m \frac{\sin(m*\alpha)*\cos(m*x)}{m} \tag{2}$$

$$f_1(x) = \frac{V*\alpha}{\pi} - \tag{3}$$

$$\frac{2*V}{\pi} * \left[ \frac{\sin(\alpha)*\cos(x)}{1} - \frac{\sin(2\alpha)*\cos(2x)}{2} + \frac{\sin(3\alpha)*\cos(3x)}{3} \cdots \right]$$

In Equations (2) and (3), $$\frac{V*\alpha}{\pi}$$

is a DC term. The second term $$\left( -\frac{2*V}{\pi} * [\sin(\alpha)*\cos(x)] \right)$$

represents the fundamental clock. The third term $$\left( \frac{V}{\pi} * [\sin(2\alpha)*\cos(2x)] \right)$$

represents the second order harmonic. The term $$\left( (-1)^m \frac{2*V}{m\pi} * [\sin(m\alpha)*\cos(mx)] \right)$$

represents the m-th harmonic.

The image distortion is related to the fundamental clock. The second order LO harmonic is related to the third term described above. The duty ratio error may cause two different gain factors. A first gain factor can be expressed as $$\sin(a_1) = \sin\left( \frac{2*\pi*D}{N} \right).$$

A second gain factor can be expressed as $$(\alpha_2) = \frac{2*\pi*(1-D)}{N}.$$

In this two gain factors, D is the duty ratio. Referring back to FIG. 12, different phases may have a different duty cycle. T1 may be considered as the duty cycle (D). Then, T2 is equal to (1−D). In other words, some phases (e.g., Phase 1 shown in FIG. 12) have the gain factor of $$\sin(\alpha_1) = \sin\left( \frac{2*\pi*D}{N} \right).$$

Other phases (e.g., Phase 2 shown in FIG. 12) have the gain factor of $$\sin(\alpha_2) = \frac{2*\pi*(1-D)}{N}.$$

Based on the different gain factors, the desired output signal (TX) of the mixer and the image distortion can be expressed by the following equations:

$$TX = \sum_{m=0}^{2*N-1} b_m * e^{-1i\left(2\pi*fbb*t+\frac{m*2*\pi}{N}+\psi_m\right)} * C_m * e^{1i\left(2\pi*fLO*t+\frac{m*2*\pi}{N}+\theta_m\right)} \tag{4}$$

$$Image = \sum_{m=0}^{2*N-1} b_m * e^{1i\left(2\pi*fbb*t+\frac{m*2*\pi}{N}+\psi_m\right)} * C_m * e^{1i\left(2\pi*fLO*t+\frac{m*2*\pi}{N}+\theta_m\right)} \tag{5}$$

In Equations (4) and (5), $b_m$ is the signal level of the m-th baseband signal. $\psi_m$ is the phase error of the m-th baseband signal. $C_m$ is the signal level of the m-th LO clock signal. $\theta_m$ is the phase error of the m-th LO clock signal. N is the total number of phases.

In some embodiments, only LO duty ratio error exists. The VCO operates at a frequency equal to fLO*N/2. The LO duty ratio error contributes the final LO clock duty ratio error. The following equations can be satisfied:

$$C_m = \sin\left(\frac{2 * \pi * D}{N}\right)$$

when m is an even number;

$$C_m = \sin\left(\frac{2 * \pi * (1 - D)}{N}\right)$$

when m is an odd number. $b_m$ is equal to b which is a constant. $\psi_m$ is equal to zero. $\theta_m$ is equal to zero. After considering these equations, Equations (4) and (5) can be simplified as:

$$TX = N * b * \left(\sin\left(\frac{2 * \pi * D}{N}\right) + \sin\left(\frac{2 * \pi * (1 - D)}{N}\right)\right) * e^{1i(2\pi*(fLO-fbb)*t)} \quad (6)$$

$$\text{Image} = b * \sum_{m=0}^{N-1}\left(\sin\left(\frac{2\pi D}{N}\right) * e^{1i*\frac{2m*2\pi}{N}} + \sin\left(\frac{2\pi(1-D)}{N}\right) * e^{1i*\frac{(m*2+1)*2\pi}{N}}\right) * \quad (7)$$

$$e^{1i(2\pi*(fLO+fbb)*t)}$$

When N is greater than or equal to 3, and N is not equal to 4, the image value of Equation (7) is equal to zero. Equation (7) indicates either the three-phase operating mode or the six-phase operating mode can eliminate the image distortion.

Based on the analysis above, for lowering the image distortion, either a six-phase operating mode (N=6) or a three-phase operating mode (N=3) can be employed because both operating mode can reject the image distortion from VCO duty ratio error, which typically is the main source of the image distortion in a traditional quadrature IQ system. Typically, in the TX system, a high value of N for VCO does not cause a problem for low frequency operation. The issue normally comes up at a higher frequency of the LO signal. This means the six-phase operating mode can be used in a low band (LB) and a high band (HB). At an ultra-high band (UHB), either the six-phase or three-phase can be employed depending on the CIM requirement.

The LO clock related harmonics in a generic N-phase system can be expressed as:

$$LOHD2n = \quad (8)$$

$$\sum_{m=0}^{2*N-1} b_m * e^{1i\left(2\pi*fbb*t+\frac{m*2*\pi}{N}+\psi_m\right)} * C_m * e^{1i\left(2\pi*2*fLO*t+2*\frac{m*2*\pi}{N}+2*\theta_m\right)}$$

$$LOHD2p = \quad (9)$$

$$\sum_{m=0}^{2*N-1} b_m * e^{-1i\left(2\pi*fbb*t+\frac{m*2*\pi}{N}+\psi_m\right)} * C_m * e^{1i\left(2\pi*2*fLO*t+2*\frac{m*2*\pi}{N}+2*\theta_m\right)}$$

$$LOHD3n = \quad (10)$$

$$\sum_{m=0}^{2*N-1} b_m * e^{1i\left(2\pi*fbb*t+\frac{m*2*\pi}{N}+\psi_m\right)} * C_m * e^{1i\left(2\pi*3*fLO*t+3*\frac{m*2*\pi}{N}+3*\theta_m\right)}$$

-continued $$LOHD3p = \quad (11)$$

$$\sum_{m=0}^{2*N-1} b_m * e^{-1i\left(2\pi*fbb*t+\frac{m*2*\pi}{N}+\psi_m\right)} * C_m * e^{1i\left(2\pi*3*fLO*t+3*\frac{m*2*\pi}{N}+3*\theta_m\right)}$$

LOHD2n is a LO related second order harmonic. LOHD2n has the opposite sign of the desired TX baseband signal. LOHD2p is a LO related second order harmonic. LOHD2p has the same sign of the desired TX baseband signal. LOHD3n is a LO related third order harmonic. LOHD3n has the opposite sign of the desired TX baseband signal. LOHD3p is a LO related third order harmonic. LOHD3p has the same sign of the desired TX baseband signal.

Non-linearity in a RF system may be from a plurality of sources such as the non-linearity of the low-pass filters, the non-linearity of the on-resistance of the mixers and the like. The baseband second order and third order non-linearity may cause the second order counter intermodulation (CIM2) and the third order counter intermodulation (CIM3). CIM2 and CIM3 can be expressed as:

$$CIM2n = \quad (12)$$

$$\sum_{m=0}^{2*N-1} b_m * e^{1i\left(2\pi*2*fbb*t+2*\frac{m*2*\pi}{N}+2*\psi_m\right)} * C_m * e^{1i\left(2\pi*fLO*t+\frac{m*2*\pi}{N}+\theta_m\right)}$$

$$CIM2p = \quad (13)$$

$$\sum_{m=0}^{2*N-1} b_m * e^{-1i\left(2\pi*2*fbb*t+2*\frac{m*2*\pi}{N}+2*\psi_m\right)} * C_m * e^{1i\left(2\pi*fLO*t+\frac{m*2*\pi}{N}+\theta_m\right)}$$

$$CIM3n = \quad (14)$$

$$\sum_{m=0}^{2*N-1} b_m * e^{1i\left(2\pi*3*fbb*t+3*\frac{m*2*\pi}{N}+3*\psi_m\right)} * C_m * e^{1i\left(2\pi*fLO*t+\frac{m*2*\pi}{N}+\theta_m\right)}$$

$$CIM3p = \quad (15)$$

$$\sum_{m=0}^{2*N-1} b_m * e^{-1i\left(2\pi*3*fbb*t+3*\frac{m*2*\pi}{N}+3*\psi_m\right)} * C_m * e^{1i\left(2\pi*fLO*t+\frac{m*2*\pi}{N}+\theta_m\right)}$$

The post mixer non-linearity may convert LOHDx (e.g., LOHD2n, LOHD2p, LOHD3n and LOHD3p) into CIMx (e.g., CIM2 and CIM3). Equations (8)-(15) indicate for a transmitter configured to operate in a six-phase operating mode, CIM2n, CIM2p, CIM3n, CIM3p, LOHD2n, LOHD2p, LOHD3n and LOHD3p are all cancelled when the LO clock is ideally generated. For a transmitter configured to operate in a three-phase operating mode, CIM2p, CIM3n, CIM3p, LOHD2p, LOHD3n and LOHD3p are all cancelled when the LO clock is ideally generated. In other words, the three-phase operating mode cannot eliminate or reduce LOHD2n and CIM2n.

In operation, LOHD2n and the desired TX signal will mix inside the PA through the second order non-linearity. If a single ended PA is used, the CIM2 distortion will be generated at the output of the PA.

Referring back to FIG. 4, a combination of the three-phase operating mode and the six-phase operating mode is able to improve the performance of a RF system. More particularly, the CIM2 distortion under the single ended PA may be tolerable because no stringent frequency bands (e.g., a protected frequency band) are adjacent to the transmitting frequencies of the transmitter. The three-phase operating mode can be used to reduce the power consumption for the transmitter. On the other hand, when a protected frequency band is adjacent to the transmitting frequency, the corresponding mixer is configured to operate in the six-phase operating mode. As a result of operating in the six-phase the clock related second order harmonic is cancelled. The CIM2 distortion at the antenna port has been reduced.

Referring back to FIG. 5, a differential PA may be employed to reduce distortions. More particularly, because the differential PA can reduce distortions, the mixer is allowed to operate in the three-phase operating mode even when there is stringent CIM2 requirement (e.g., a protected frequency band adjacent to the transmitting frequency generated by the mixer). In some embodiments, the differential PA helps to reduce the CIM2 generated from the second order non-linearity through the differential operation, thus achieving low CIM2 at the antenna.

Referring back to FIG. 6, the DPD function unit may be employed to reduce distortions. More particularly, because the DPD function unit can reduce distortions, the mixer is allowed to operate in the three-phase operating mode even when there is stringent CIM2 requirement (e.g., a protected frequency band adjacent to the transmitting frequency generated by the mixer).

It is important to note that the distortion result above assumes the static mismatches have been removed. In other words, the digital correction circuit and/or other suitable correction circuit are still employed to remove the static portion of the image distortion. The static portion of the image distortion may be caused by various factors such as layout constraints and the like. The static portion of the image correction can be determined from the lab characterization; thus it does not require factory based part to part calibrations.

Figure 14:
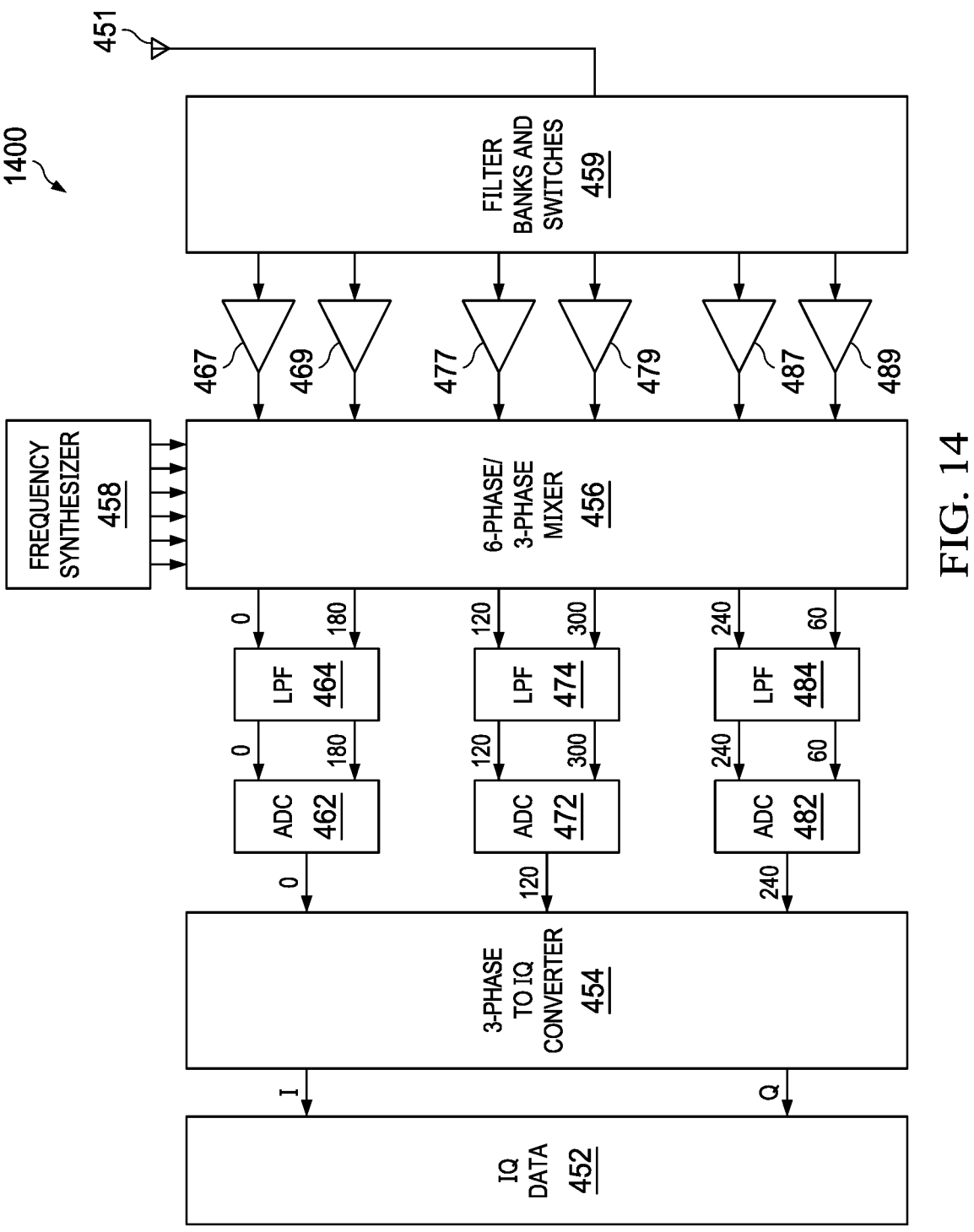
FIG. 14 illustrates a block diagram of a receiver in accordance with various embodiments of the present disclosure.

FIG. 14 illustrates a block diagram of a receiver in accordance with various embodiments of the present disclosure. In some embodiments, the receiver 1400 may be used in the UE shown in FIG. 2. Alternatively, the receiver 1400 may be used in the base station shown in FIG. 3. Furthermore, the receiver 1400 may be used in any suitable radio frequency systems.

The receiver 1400 comprises a filter 459, VGAs 467, 469, 477, 479, 487, and 489, a 6-phase/3-phase mixer 456, a frequency synthesizer 458, LPFs 464, 474, and 484, analog-to-digital converters (ADCs) 462, 472, and 482, and a 3-phase to IQ converter 454 and IQ data 452.

The VGAs may be implemented as a low noise amplifier. The VGAs apply suitable gains to respective RF signals. The outputs of the VGAs are fed into the 6-phase/3-phase mixer 456. The 6-phase/3-phase mixer 456 is similar to the 6-phase/3-phase mixer 406 shown in FIG. 4, and hence is not discussed in detail herein.

The mixers of 6-phase/3-phase mixer 456 are configured to receive a plurality of LO signals from the frequency synthesizer 458. Based on the LO signals, the mixers down-convert the frequency of the RF signals to a baseband frequency.

In some embodiments, a blocker signal may occur in the RF system. The blocker signal is a signal that is not in a signaling frequency band of interest but in other frequency bands. The blocker signal may block signals of interest. In some embodiments, the blocker signal is located adjacent to the second or fourth harmonic of a first LO frequency used by a first mixer of the 6-phase/3-phase mixer 456, and no blocker signal is located adjacent to the second or fourth harmonic of a second LO frequency used by the second mixer the 6-phase/3-phase mixer 456. In response to this blocker signal, the first mixer of the 6-phase/3-phase mixer 456 is configured to operate in a six-phase operating mode to reduce the distortions of the RF system. The second mixer of the 6-phase/3-phase mixer 456 is configured to operate in a three-phase operating mode to reduce power consumption of the RF system. The six-phase operating mode and the three-phase operating mode of a mixer have been discussed above with respect to FIG. 4, and hence are not discussed again.

As shown in FIG. 14, the outputs of the 6-phase/3-phase mixer 456 are filtered by LPFs, and then converted to a 0-degree digital signal, a 120-degree digital signal and a 240-degree digital signal by ADCs. In the 3-phase to IQ converter 454, these three digital signals are converted to digital I and Q signals. The digital I and Q signals are fed into the IQ data 452.

FIG. 15 illustrates a flow chart of a method for reducing distortions in accordance with various embodiments of the present disclosure. This flowchart shown in FIG. 15 is merely an example, which should not unduly limit the scope of the claims. One of ordinary skill in the art would recognize many variations, alternatives, and modifications. For example, various steps illustrated in FIG. 15 may be added, removed, replaced, rearranged and repeated.

A radio frequency system comprises a transmitter and/or a receiver. In the radio frequency system, a plurality of mixers is configured to convert baseband analog signals into radio frequency signals in different frequency bands. A first mixer of the plurality of mixers is configured to convert the baseband analog signals into first radio frequency signals in a low frequency band. A second mixer of the plurality of mixers is configured to convert the baseband analog signals into second radio frequency signals in an ultra-high frequency band. A third mixer of the plurality of mixers is configured to convert the baseband analog signals into third radio frequency signals in a high frequency band. In operation, a protected frequency band is adjacent to a first transmitting frequency of the first RF signals generated by the first mixer. The protected frequency band is away from a second transmitting frequency of the second RF signals generated by the second mixer.

At step 1502, the plurality of mixers is configured to convert between a plurality of phase signals and a plurality of RF signals. The plurality of phase signals is the phase baseband signals generated by a plurality of DACs of the radio frequency system shown in FIG. 4. The plurality of RF signals is signals to be transmitted by a plurality of antennas of the radio frequency system.

At step 1504, a first mixer of the plurality of mixers is configured to operate in a six-phase operating mode to reduce the distortions of the radio frequency system. In the six-phase operating mode, the first mixer receives six LO signals and six baseband analog signals. Based on the six LO signals, the first mixer un-converts the six baseband analog signals to the first radio frequency signals in the low frequency band. The six-phase operating mode is able to eliminate or reduce the distortions around the transmitting frequency of the first radio frequency signals. As a result of having this distortion elimination, the radio frequency system does not cause interference to the protected frequency band.

At step 1506, a second mixer of the plurality of mixers is configured to operate in a three-phase operating mode to reduce power consumption of the RF system. In the three-phase operating mode, the second mixer receives three LO signals and six baseband analog signals. Based on the three LO signals, the second mixer un-converts the six baseband analog signals to the second radio frequency signals in the ultra-high frequency band.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for reducing distortions of a radio frequency (RF) system, the method comprising:

configuring a plurality of mixers to convert between a plurality of phase signals and a plurality of RF signals;

configuring a first mixer of the plurality of mixers to operate in a six-phase operating mode to reduce the distortions of the RF system;

configuring a second mixer of the plurality of mixers to operate in a three-phase operating mode to reduce power consumption of the RF system, at least one of the first mixer or the second mixer being coupled to a single-ended power amplifier (PA); and processing the plurality of phase signals and the plurality of RF signals through the configured first mixer.

2. The method of claim 1, wherein the plurality of mixers is coupled to a transmitter of the RF system, each of the first mixer and the second mixer is coupled to one or more single-ended PAs, and a protected frequency band is located adjacent to a first transmitting frequency of first RF signals generated by the first mixer and away from a second transmitting frequency of second RF signals generated by the second mixer.

3. The method of claim 1, wherein the plurality of mixers is coupled to a transmitter of the RF system, the first mixer being coupled to the single-ended PA, the second mixer being coupled to a differential PA, and a protected frequency band is located adjacent to a second transmitting frequency of second RF signals generated by the second mixer.

4. The method of claim 1, wherein the plurality of mixers is coupled to a transmitter of the RF system, each of the first mixer and the second mixer is coupled to the single-ended PA, and a protected frequency band is located adjacent to a second transmitting frequency of second RF signals generated by the second mixer, and wherein an enabled digital pre-distortion algorithm is configured to reduce a second order counter intermodulation (CIM2) component.

5. The method of claim 1, wherein the plurality of mixers is coupled to a receiver of the RF system, and a blocker signal is located adjacent to a second or fourth harmonic of a first local oscillator (LO) frequency used by the first mixer, and no blocker signal is located adjacent to a second or fourth harmonic of a second LO frequency used by the second mixer.

6. The method of claim 1, wherein:

a second transmitting frequency of second RF signals processed by the second mixer is higher than a first transmitting frequency of first RF signals processed by the first mixer.

7. The method of claim 1, further comprising:

receiving a digital in-phase signal and a quadrature-phase signal;

converting the digital in-phase signal and the quadrature-phase signal into a first phase digital signal offset in phase from the digital in-phase signal by 0 degrees, a second phase digital signal offset in phase from the digital in-phase signal by 120 degrees and a third phase digital signal offset in phase from the digital in-phase signal by 240 degrees;

through three digital-to-analog converters, converting the first phase digital signal, the second phase digital signal and the third phase digital signal into six phase baseband signals offset by 60 degrees from each other; and producing, based on the six phase baseband signals and a plurality of LO signals, first RF signals processed by the first mixer.

8. The method of claim 1, further comprising:

generating three LO signals in response to the three-phase operating mode of the second mixer, wherein the three LO signals are offset by 120 degrees from each other, and each of the three LO signals is of a duty cycle of about 33.33%; and generating six LO signals in response to the six-phase operating mode of the first mixer, wherein the six LO signals are offset by 60 degrees from each other, and each of the six LO signals is of a duty cycle of about 16.67%.

9. The method of claim 8, further comprising:

generating a voltage-controlled oscillator (VCO) signal in a phase lock loop, wherein the VCO signal is used to produce the three LO signals in response to the three-phase operating mode of the second mixer, and the six LO signals in response to the six-phase operating mode of the first mixer.

10. The method of claim 8, further comprising:

under the six-phase operating mode, configuring the first mixer to mix six phase baseband signals with the six LO signals to generate first RF signals; and under the three-phase operating mode, configuring the second mixer to mix the six phase baseband signals with the three LO signals to generate second RF signals.

11. A method for reducing distortions in a radio frequency (RF) system, the method comprising:

producing six local oscillator (LO) signals by an LO generator, the six LO signals being fed into a plurality of mixers;

configuring a first mixer of the plurality of mixers to operate in a six-phase operating mode to reduce the distortions in the RF system;

configuring a second mixer of the plurality of mixers to operate in a three-phase operating mode to reduce power consumption of the RF system, at least one of the first mixer or the second mixer being coupled to a single-ended power amplifier (PA); and processing RF signals of the RF system through the configured first mixer.

12. The method of claim 11, wherein:

the plurality of mixers is coupled to a transmitter of the RF system;

each of the plurality of mixers is coupled to one or more single-ended PAs; and a protected frequency band is located adjacent to a first transmitting frequency of first RF signals generated by the first mixer, and no protected frequency band is located adjacent to a second transmitting frequency of second RF signals generated by the second mixer.

13. The method of claim 11, further comprising:

configuring the first mixer to generate first RF signals in a first frequency band; and configuring the second mixer to generate second RF signals in a second frequency band higher than the first frequency band.

14. The method of claim 11, further comprising:

receiving a digital in-phase signal and a quadrature-phase signal;

converting the digital in-phase signal and the quadrature-phase signal into a first phase digital signal offset in phase from the digital in-phase signal by 0 degrees, a second phase digital signal offset in phase from the digital in-phase signal by 120 degrees and a third phase digital signal offset in phase from the digital in-phase signal by 240 degrees;

through three digital-to-analog converters, converting the first phase digital signal, the second phase digital signal and the third phase digital signal into six phase signals offset by 60 degrees from each other;

generating six LO signals in response to the six-phase operating mode of the first mixer, wherein the six LO signals are offset by 60 degrees from each other, and each of the six LO signals is of a duty cycle of about 16.67%; and producing, based on the six phase signals and the six LO signals, first RF signals generated by the first mixer.

15. The method of claim 11, further comprising:

receiving a digital in-phase signal and a quadrature-phase signal;

converting the digital in-phase signal and the quadrature-phase signal into a first phase digital signal offset in phase from the digital in-phase signal by 0 degrees, a second phase digital signal offset in phase from the digital in-phase signal by 120 degrees and a third phase digital signal offset in phase from the digital in-phase signal by 240 degrees;

through three digital-to-analog converters, converting the first phase digital signal, the second phase digital signal and the third phase digital signal into six phase signals offset by 60 degrees from each other;

generating three LO signals in response to the three-phase operating mode of the second mixer, wherein the three LO signals are offset by 120 degrees from each other, and each of the three LO signals is of a duty cycle of about 33.33%; and producing, based on the six phase signals and the three LO signals, second RF signals generated by the second mixer.

16. A radio frequency (RF) system comprising:

a local oscillator (LO) generator configured to generate a plurality of LO signals;

a first mixer configured to receive six phase signals offset by 60 degrees from each other and six LO signals generated by the LO generator, the first mixer being configured to operate in a six-phase mode in which the six phase signals are mixed with the six LO signals to generate first RF signals; and a second mixer configured to receive the six phase signals and three LO signals generated by the LO generator, the second mixer being configured to operate in a three-phase mode in which the six phase signals are mixed with the three LO signals to generate second RF signals, at least one of the first mixer or the second mixer being coupled to a single-ended power amplifier (PA).

17. The RF system of claim 16, further comprising:

a third mixer configured to receive the six phase signals and the six LO signals, the third mixer being configured to operate in the six-phase mode in which the six phase signals are mixed with the six LO signals to generate third RF signals, wherein the first RF signals are in a low frequency band, the second RF signals are in an ultra-high frequency band, and the third RF signals are in a high frequency band.

18. The RF system of claim 16, wherein the LO generator comprises:

a voltage controlled oscillator (VCO) configured to generate a VCO signal; and a frequency LO generator configured to produce the plurality of LO signals.

19. The RF system of claim 16, further comprising:

an IQ source configured to provide digital I and Q signals;

an IQ-to-3 phase converter configured to convert the digital I and Q signals to first, second and third phase digital signals;

first, second, and third digital-to-analog converters (DACs) configured to convert the first, second and third phase digital signals into first, second, and third differential pairs of analog signals; and first, second, and third filters configured to filter the first, second, and third differential pairs of analog signals and generate the six phase signals.

20. The RF system of claim 16, the single-ended PA being coupled to outputs of the first mixer.

* * * * *